United States Patent Office 3,300,513
Patented Jan. 24, 1967

3,300,513
2-ACYL-2-AZABICYCLO[3.2.2]-6-NONENES
Leo A. Paquette, Portage Township, Kalamazoo County, Mich., assignor to The Upjohn Company, Kalamazoo, Mich., a corporation of Delaware
No Drawing. Original application July 24, 1963, Ser. No. 297,217, now Patent No. 3,268,553, dated Aug. 23, 1966. Divided and this application Feb. 3, 1966, Ser. No. 559,345
2 Claims. (Cl. 260—326)

This is a division of application Serial No. 297,217, filed July 24, 1963, now Patent No. 3,268,553.

This invention relates to novel compositions of matter and to methods for producing them. In particular, this invention relates to novel 2-azabicyclo[3.2.2]non-6-ene-8,9-dicarboximides of the formulas:

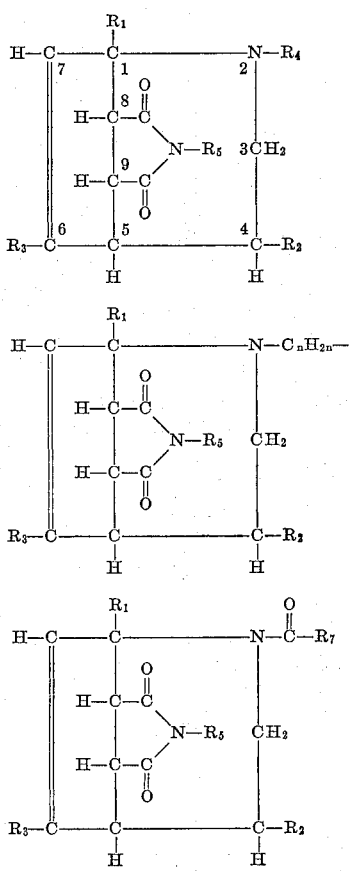

wherein $R_1$ and $R_2$ are alkyl of 1 to 4 carbon atoms, inclusive, wherein $R_3$ and $R_7$ are selected from the group consisting of hydrogen and alkyl of 1 to 4 carbon atoms, inclusive, wherein $R_4$ is selected from the group consisting of hydrogen, lower alkyl, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, wherein $R_5$ is selected from the group consisting of lower alkyl, phenyl, lower-alkylphenyl, and di-lower-alkylphenyl, wherein $R_6$ is selected from the group consisting of di-lower-alkylamino and the hetercyclic moieties, aziridinyl, azetidinyl, pyrrolidinyl, piperidino, hexahydroazepinyl, heptamethylenimino, octa-methylenimino, morpholino, and thiomorpholino, each of said heterocyclic moieties having attached as substituents on carbon atoms thereof zero to 3 lower alkyls, inclusive, wherein $n$ is 2 to 6, inclusive, wherein N and $R_6$ are separated by a chain of at least 2 carbon atoms, and wherein the nitrogen atom of $R_6$ is attached to a carbon atom of $C_nH_{2n}$. The several alkyl groups which are or can be associated with a compound of Formula I, Formula II, or Formula III can all be different or any two or more of them can be alike.

Examples of alkyl of 1 to 4 carbon atoms, inclusive, are methyl, ethyl, propyl, butyl, and isomeric forms thereof. Examples of lower alkyl are methyl, ethyl, propyl butyl, pentyl, hexyl, heptyl, octyl, and isomeric forms thereof. Examples of alkenyl of 3 to 6 carbon atoms inclusive, are allyl, 1-methylallyl, 2-methylallyl (methallyl), 2-butenyl (crotyl), 3-butenyl, 1,2-dimethylallyl, 2 ethylallyl, 1-methyl-2-butenyl, 2-methyl-2-butenyl, 3 methyl-2-butenyl, 3-pentenyl, 2,3-dimethyl-2-butenyl, 1,3 dimethyl-2-butenyl, 1-ethyl-2-butenyl, 4-methyl-2-pentenyl, 5-hexenyl, and the like. Examples of alkynyl o 3 to 6 carbon atoms, inclusive, are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl and the like. Examples of cycloalkyl of 5 to 10 carbon atoms, inclusive, are cyclopentyl, cyclohexyl, 2-methyl cyclopentyl, 2-methylcyclohexyl, 3-methylcyclohexyl, 4 methylcyclohexyl, 2-ethylcyclopentyl, 3-ethylcyclopentyl 3-ethylcyclohexyl, 2-propylcyclopentyl, 3-isopropylcyclo pentyl, 4-propylcyclohexyl, 2,3-dimethylcyclohexyl, 2 methyl-4-ethylcyclohexyl, cycloheptyl, 3-ethylcycloheptyl cyclooctyl, 4-tert-butylcyclohexyl, 2,3-dimethylcyclooctyl cyclononyl, cyclodecyl, and the like. Examples of ar alkyl of 7 to 11 carbon atoms, inclusive, are benzyl, phen ethyl, 2-phenylpropyl, 3-phenylpropyl, 4-phenylbutyl, 1 naphthylmethyl, 2-naphthylmethyl, and the like. Ex amples of lower-alkylphenyl are the isomeric forms o tolyl, ethylphenyl, propylphenyl, butylphenyl, pentylphen yl, hexylphenyl, and the like. Examples of di-lower alkylphenyl are the isomeric forms of xylyl, ethylmethyl phenyl, diethylphenyl, methylpropylphenyl, ethylpropyl phenyl, dipropylphenyl, butylmethylphenyl, butylethyl phenyl, butylpropylphenyl, dibutylphenyl, methylpentyl phenyl, ethylhexylphenyl, and the like. Examples o heterocyclic moieties within the scope of $R_6$, in addition t those already mentioned above, are 2-methylaziridinyl 2-ethylaziridnyl, 2-butylaziridinyl, 2,3-dimethylaziridiny 2,2-dimethylaziridinyl, 2-methylazetidinyl, 3-methylazeti dinyl, 2-octylazetidinyl, 2,2-dimethylazetidinyl, 3,3-dieth ylazetidinyl, 2,4,4-trimethylazetidinyl, 2,3,4-trimethylaze tidinyl, 2-methylpyrrolidinyl, 3-butylpyrrolidinyl, 2-iso hexylpyrrolidinyl, 2,3-dimethylpyrrolidinyl, 2,2-dimethyl pyrrolidinyl, 2,5-diethylpyrrolidinyl, 3-tert-butylpyrroli dinyl, 2,3,5-trimethylpyrrolidinyl, 3,4-dioctylpyrrolidiny 2-methylpiperidino, 3-methylpiperidino, 4-methylpiperi dino, 3-isopropylpiperidino, 4-tert-butylpiperidino, 2-meth yl-5-ethylpiperidino, 3,5-dipentylpiperidino, 2,4,6-trimeth ylpiperidino, 2,6-dimethyl-4-octylpiperidino, 2,3,5-triethy piperidino, 2-ethylhexahydroazepinyl, 4-tert-butylhexa hydroazepinyl, 3-heptylhexahydroazepinyl, 2,4-dimethyl hexahydroazepinyl, 3,3-dimethylhexahydroazepinyl, 2,4,6 tripropylhexahydroazepinyl, 2-methylheptamethylenimi no, 5-butylheptamethylenimino, 2,4-diisopropylheptameth ylenimino, 3,3-diethylheptamethylenimino, 2,5,8-trimeth ylheptamethylenimino, 3-methyloctamethylenimino, 2,9 diethyloctamethylenimino, 4 - isooctyloctamethyleniminc 2-ethylmorpholino, 2-methyl-5-ethylmorpholino, 3,3-di methylmorpholino, 2,6-di-tert-butylmorpholino, 3-methyl thiomorpholino, 2,2-diethylthiomorpholino, 2,6-dihexyl thiomorpholino, and the like. In each of the above ex amples of heterocyclic moieties, the free valence, an hence the point of attachment to a carbon atom of $C_nH_{2n}$ in Formula II is on the heterocyclic nitrogen atom. Examples of suitable —$C_nH_{2n}$— bridges are —$CH_2CH_2$—,

—$CH_2CH_2CH_2$—, —$CH_2CH(CH_3)$—

—$CH_2CH_2CH_2CH_2$—, —$CH_2CH_2CH(CH_3)$—

$CH_2CH(CH_3)CH_2$—, —$CH_2CH(CH_2CH_3)$—

—$CH(CH_3)CH(CH_3)$—, —$CH_2CH_2CH_2CH_2CH_2$—

—$CH_2CH_2CH_2CH(CH_3)$—, —$CH_2CH_2CH(CH_3)CH_2$—

—$CH_2CH(CH_3)CH(CH_3)$—

—$CH(CH_3)CH_2CH(CH_3)$—

—$CH_2CH_2CH(CH_2CH_3)$—

—$CH_2CH(CH_2CH_2)CH_3$—

—$CH(CH_3)CH(CH_2CH_3)$—

—$CH_2CH_2CH_2CH_2CH_2CH_2$—

—$CH_2CH_2CH_2CH_2CH(CH_3)$—

—$CH_2CH(CH_2CH_2CH_3)$—

—$CH_2CH_2CH_2CH(CH_3)CH_2$—

—$CH_2CH_2CH(CH_3)CH_2CH_2$—

—$CH_2CH_2CH(CH_3)CH(CH_3)$—

—$CH_2CH(CH_3)CH(CH_3)CH_2$—

—$CH(CH_3)CH_2CH_2CH(CH_3)$—

—$CH(CH_2CH_3)CH(CH_2CH_3)$—

—$CH_2CH(CH_2CH_2CH_3)CH_2$— and the like. The point of attachment of the nitrogen atom of the 2-azabicyclo[3.2.2]non-6-ene-8,9-dicarboximide moiety in compounds of Formula II can be at either end of the above examples of —$C_nH_{2n}$—.

The novel 2-azabicyclo[3.2.2]non-6-ene-8,9-dicarboximides of Formulas I and II are amines and exist either in the non-protonated (free base) form or the protonated (acid addition salt) form depending on the pH of the environment. They form stable protonates, i.e., acid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. The Formula II compounds form both mono- and diacid addition salts. The acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel free bases of Formulas I and II form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I and Formula II compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I or Formula II with the free acid form of a penicillin, or by a metathetical exchange of the anion of an acid addition salt of a compound of Formula I or Formula II, for example, the chloride ion of a hydrochloride, with the anionic form of a penicillin.

The novel free bases of Formulas I and II are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The novel compounds of Formulas I and II also form useful quaternary ammonium salts. For example, they form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, and the like.

The higher alkyl quaternary ammonium salts of the novel Formula I and Formula II 2-azabicyclo[3.2.2]non-6-ene-8,9-dicarboximides, for example, wherein the alkyl group is of 9 to 20 carbon atoms, inclusive, exhibit valuable surface-active and cation-active wetting and emulsifying properties, and also exhibit valuable bateriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula I and Formula II are useful as intermediates in the preparation of said alkyl quaternary ammonium salts.

The novel 2-azabicyclo[3.2.2]non-6-ene-8,9-dicarboximides of Formulas I, II, and III are useful in the treatment of plant infections caused by such fungi as *Alternaria solani*, and for treating *B. subtilis* infected breeding places of silkworms. These compounds also inhibit the growth of *M. phlei* and *K. pneumoniae*, and inhibit the action of Newcastle disease virus on chick embryo cells. Tests with animals have also shown these compounds to have sedative and anorexigenic effects, and the compounds are therefore useful for these purposes.

The novel 2-azabicyclo[3.2.2]non-6-ene-8,9-dicarboximides of Formula I are prepared by reacting a 1,3-dihydro-2H-azepine of the formula:

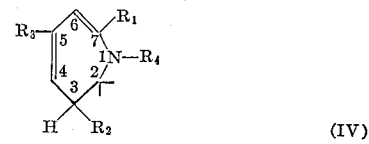

(IV)

wherein $R_1$, $R_2$, $R_3$, and $R_4$ are as given above with a maleimide of the formula:

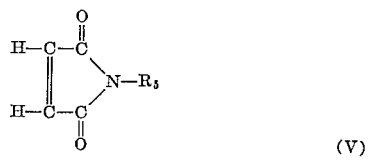

(V)

wherein $R_5$ is as given above.

The novel 2-azabicyclo[3.2.2]non-6-ene-8,9-dicarboximides of Formula II are prepared by reacting a 1,3-dihydro-2H-azepine of the formula:

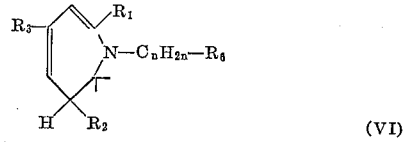

(VI)

wherein $R_1$, $R_2$, $R_3$, $R_6$, and $n$ are as given above, with a maleimide of Formula V.

Maleimides of Formula V are either known in the art or can be prepared by methods known in the art [e.g., U.S. Patents 2,444,536; 3,018,290; 3,018,292; and "Organic Syntheses," John Wiley & Sons, New York, vol. 41, page 93 (1961)].

1,3-dihydro-2H-azepines of Formulas IV and VI are novel in the art. They can be prepared by reacting the corresponding 1,3-dihydro-2H-azepin-2-ones with lithium aluminum hydride, and then treating the resulting reaction mixtures with water and a base according to the equations:

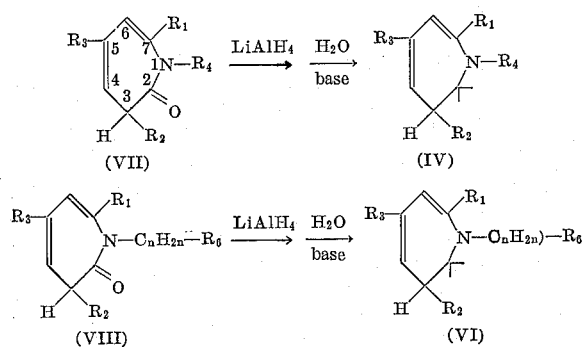

the $-C_nH_{2n}-R_6$ moiety. These N-substitutions are carried out in two steps according to the equations:

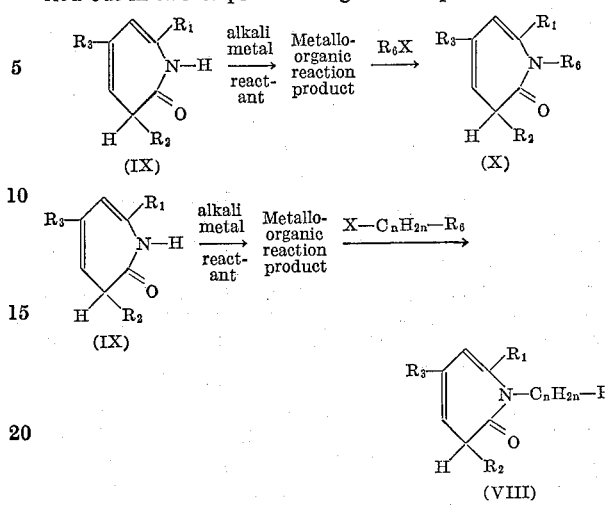

In these equations, $R_1$, $R_2$, $R_3$, $R_6$, and $n$ are as given above; the alkali metal reactant is a material selected from the group consisting of alkali metals, alkali metal hydrides, and alkali metal amides; and $R_6X$ and $$X-C_nH_{2n}-R_6$$

are organic halides wherein X is selected from the group consisting of chloride, bromide, and iodide. $R_6$ is selected from the group consisting of lower alkyl, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. It will be noted that this definition of $R_6$ excludes hydrogen but is otherwise the same as the above definition of $R_4$. $R_6$ and X are separated by a chain of at least carbon atoms, the nitrogen atom of $R_6$ being attached to a carbon atom of $C_nH_{2n}$.

In these equations, $R_1$, $R_2$, $R_3$, $R_4$, $R_6$, and $n$ are as given above.

1,3-dihydro-2H-azepin-2-ones of Formula VII wherein $R_1$, $R_2$, and $R_3$ are as given above and wherein $R_4$ is hydrogen are either known in the art or can be prepared by the method known in the art, i.e., by interaction of the sodium salt of a diortho-substituted phenol with an ethereal solution of chloramide ($ClNH_2$), preferably in the presence of an excess of the phenol [Theilacker et al., Angew. Chem., 72, 131 (1960); ibid., 75, 208–9 (1963)]. Phenols suitable for this reaction are known in the art or can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of suitable phenols are 2,6-dimethylphenol (2,6-xylenol), 2,4,6-trimethylphenol (mesitol), 2,6-diethylphenol, 2,4,6-triethylphenol, 2,6-dipropylphenol, 2,6-diisopropylphenol, 2,4,6-triisopropylphenol, 2,6-diisobutylphenol, 2,4,6-tri-tert-butylphenol, 2-ethyl-6-methylphenol, 2-methyl-6-propylphenol, 2-ethyl-6-propylphenol, 2-tert-butyl-6-methylphenol, 2-sec-butyl-6-methylphenol, 2-tert-butyl-6-ethylphenol, 2-tert-butyl-6-isopropylphenol, 2-isobutyl-6-propylphenol, 4-sec-butyl-2,6-dimethylphenol, 4-tert-butyl-2,6-dimethylphenol, 2,4-dimethyl-6-ethylphenol, 2,4-dimethyl-6-propylphenol, 6-tert-butyl-2,4-dimethylphenol, 2,6-diethyl-4-methylphenol, 2,6-diisopropyl-4-methylphenol, 2,4-di-tert-butyl-6-methylphenol, 2,6-di-tert-butyl-4-ethylphenol, 2,4-di-tert-butyl-6-propylphenol, 2,6-diisobutyl-4-propylphenol, 2,6-di-tert-butyl-4-sec-butylphenol, 2-tert-butyl-4-ethyl-6-methylphenol, 2-sec-butyl-6-isopropyl-4-methylphenol, 2-butyl-6-tert-butyl-4-methylphenol, and the like.

1,3-dihydro-2H-azepin-2-ones of Formula VII wherein $R_4$ is as given above but not hydrogen are prepared from the corresponding Formula VII 1,3-dihydro-2H-azepin-2-ones wherein $R_4$ is hydrogen by replacing said hydrogen with the appropriate alkyl, alkenyl, alkynyl, cycloalkyl, or aralkyl moiety. Similarly, 1,3-dihydro-2H-azepin-2-ones of Formula VIII are prepared from the corresponding Formula VII 1,3-dihydro-2H-azepin-2-ones wherein $R_4$ is hydrogen by replacing said hydrogen with For the N-substitution of Formula IX 1,3-dihydro-2H-azepin-2-ones, suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the organic reactant, i.e., the Formula IX 1,3-dihydro-2H-azepin-2-one.

The alkali metal reactant and the organic reactant are mixed, and the reaction between them is carried out at temperatures which can vary from about 0° to about 150° C., preferably from about 25° to about 100° C. The most suitable temperature will of course depend upon such factors as the reactivities of the alkali metal reactant and the organic reactant, and the nature of the solvent. For example, relatively high reaction temperatures are usually necessary when using lithium reactants and lower temperatures are preferred when using the more reactive materials such as potassium reactants. With the sodium reactants, for example, sodium hydride reaction temperatures ranging from about 25° to about 00° C. are preferred but higher or lower temperatures can be used. It is preferred to react approximately equimolecular amounts of the organic reactant and the alkali metal reactant, although an excess of either reactant can be used. The time required for completing the reaction will depend on the reaction temperature, the reactivities of the two reactants, and the nature of the solvent. Illustratively, with sodium hydride, the reaction frequently requires about 15 minutes to about 3 hours at temperatures ranging from about 50° to about 100° C.

After the reaction between the alkali metal reactant and the organic reactant is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with the organic halide of the formula $R_8X$ or the formula $$X-C_nH_{2n}-R_6$$

as above defined. It is preferred that the $R_8X$ halide be a bromide or an iodide, and that the $X-C_nH_{2n}-R_6$ halide be a chloride.

Examples of suitable $R_8X$ bromides include methyl bromide,
ethyl bromide,
propyl bromide,
isopropyl bromide,
butyl bromide,
sec-butyl bromide,
isobutyl bromide,
pentyl bromide,
isopentyl bromide,
methylbutyl bromide,
2-dimethylpropyl bromide,
ethylpropyl bromide,
methylbutyl bromide,
hexyl bromide,
cyclohexyl bromide,
methylpentyl bromide,
ethylbutyl bromide,
methylpentyl bromide,
2-dimethylbutyl bromide,
allyl bromide,
methylallyl bromide,
butenyl bromide,
butenyl bromide,
2-dimethylallyl bromide,
ethylallyl bromide,
methyl-2-butenyl bromide,
methyl-2-butenyl bromide,
methyl-2-butenyl bromide,
3-dimethyl-2-butenyl bromide,
3-dimethyl-2-butenyl bromide,
ethyl-2-butenyl bromide,
methyl-2-pentenyl bromide,
propynyl bromide,
butynyl bromide,
methyl-2-propynyl bromide,
butynyl bromide,
methyl-3-butynyl bromide,
pentynyl bromide,
pentynyl bromide,
hexynyl bromide,
methyl-3-pentynyl bromide,
cyclopentyl bromide,
cyclohexyl bromide,
methylcyclopentyl bromide,
methylcyclohexyl bromide,
methylcyclohexyl bromide,
4-methylcyclohexyl bromide,
2-ethylcyclopentyl bromide,
3-ethylcyclopentyl bromide,
4-ethylcyclohexyl bromide,
3-isopropylcyclopentyl bromide,
2,3-dimethylcyclohexyl bromide,
cycloheptyl bromide,
cyclooctyl bromide,
4-tert-butylcyclohexyl bromide,
cyclononyl bromide,
cyclodecyl bromide,
benzyl bromide,
phenethyl bromide,
2-phenylpropyl bromide,
3-phenylpropyl bromide,
4-phenylbutyl bromide,
1-naphthylmethyl bromide,
2-naphthylmethyl bromide, and the like.

Suitable $R_8X$ chlorides and iodides include those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

Examples of suitable $X-C_nH_{2n}-R_6$ chlorides are

N-(2-chloroethyl)dimethylamine,
N-(2-chloroethyl)-N-methylethylamine,
N-(2-chloroethyl)diethylamine,
N-(2-chloroethyl)dipropylamine,
N-(2-chloroethyl)diisopropylamine,
N-(2-chloroethyl)-N-methylisopropylamine,
N-(2-chloroethyl)dibutylamine,
N-(2-chloroethyl)di-sec-butylamine,
N-(2-chloroethyl)diisobutylamine,
N-(2-chloroethyl)di-tert-butylamine,
N-(2-chloroethyl)-N-methylbutylamine,
N-(2-chloroethyl)-N-ethyl-sec-butylamine,
N-(2-chloroethyl)dipentylamine,
N-(2-chloroethyl)diisopentylamine,
N-(2-chloroethyl)-N-methylpentylamine,
N-(2-chloroethyl)-N-ethyl-2-methylbutylamine,
N-(2-chloroethyl)dihexylamine,
N-(2-chloroethyl)diisohexylamine,
N-(2-chloroethyl)-N-methylhexylamine,
N-(2-chloroethyl)-N-ethyl-2,3-dimethylbutylamine,
N-(3-chloropropyl)dimethylamine,
N-(3-chloropropyl)diethylamine,
N-(3-chloropropyl)-N-methylisobutylamine,
N-(3-chloropropyl)diisopentylamine,
N-(2-chloropropyl)diethylamine,
N-(2-chloropropyl)-N-methylisopropylamine,
N-(4-chlorobutyl)dimethylamine,
N-(4-chlorobutyl)di-tert-butylamine,
N-(3-chlorobutyl)-N-methylethylamine,
N-(3-chloro-1-methylpropyl)dibutylamine,
N-(2-chloro-1-methylpropyl)diethylamine,
N-(5-chloropentyl)dimethylamine,
N-(3-chloro-1,2-dimethylpropyl)dipropylamine,
N-(5-chloro-2-methylpentyl)diethylamine,
N-(6-chlorohexyl)dihexylamine,
N-(4-chloro-1-methylpentyl)-N-methylethylamine,
N-(2-chloroethyl)aziridine,
N-(2-chloroethyl)-2-methylaziridine,
N-(3-chloropropyl)-2,3-dimethylaziridine,
N-(4-chlorobutyl)-2,2-dimethylaziridine,
N-(5-chloro-2-methylpentyl)aziridine,
N-(2-chloroethyl)azetidine,
N-(2-chloroethyl)-2-methylazetidine,
N-(3-chloropropyl)-3-methylazetidine,
N-(2-chloropropyl)-2-octylazetidine,
N-(5-chloropentyl)-2,2-dimethylazetidine,
N-(5-chloro-2-methylpentyl)-3,3-diethylazetidine,
N-(3-chloro-1,2-dimethylpropyl)-2,4,4-trimethylazetidine,
N-(2-chloroethyl)pyrrolidine, N-(3-chloropropyl)-2-methylpyrrolidine,
N-(2-chloropropyl)-3-butylpyrrolidine,
N-(4-chlorobutyl)-2-isohexylpyrrolidine,
N-(2-chloroethyl)-2,3-dimethylpyrrolidine,
N-(2-chloroethyl)-2,2,4-trimethylpyrrolidine,
N-(3-chloro-1-methylpropyl)-2,2-dimethylpyrrolidine,
N-(6-chlorohexyl)-2,5-diethylpyrrolidine,
N-(3-chlorobutyl)-3-tert-butylpyrrolidine,
N-(5-chloro-2-methylpentyl)-3,4-dioctylpyrrolidine,
N-(3-chloropropyl)piperidine,
N-(2-chloroethyl)-2-methylpiperidine,
N-(2-chloropropyl)-3-methylpiperidine,
N-(3-chlorobutyl)-4-methylpiperidine,
N-(4-chlorobutyl)-3-isopropylpiperidine,
N-(2-chloro-1-methylethyl)-4-tert-butylpiperidine,
N-(2-chloroethyl)-2,4,6-trimethylpiperidine,
N-(3-chloropropyl)-2-methyl-5-ethylpiperidine,
N-(5-chloropentyl)-3,5-dipentylpiperidine,
N-(6-chlorohexyl)-2,6-dimethyl-4-octylpiperidine,
N-(2-chloroethyl)hexahydroazepine,
N-(2-chlorobutyl)-2-ethylhexahydroazepine,
N-(3-chloropropyl)-4-tert-butylhexahydroazepine,
N-(3-chloro-1-methylpropyl)-3,3-dimethylhexahydroazepine,
N-(5-chloropentyl)-2,4,6-tripropylhexahydroazepine,
N-(2-chloroethyl)heptamethylenimine,
N-(3-chloropropyl)-2-methylheptamethylenimine,
N-(3-chlorobutyl)-2,4-diisopropylheptamethylenimine,
N-(5-chloro-2-methylpentyl)-3,3-dimethylheptamethylenimine,
N-(4-chlorobutyl)octamethylenimine,
N-(2-chloroethyl)-3-methyloctamethylenimine,
N-(6-chlorohexyl)-4-isoöctyloctamethylenimine,
N-(3-chloropropyl)morpholine,
N-(3-chloro-1-methylpropyl)-2-ethylmorpholine,
N-(2-chloroethyl)-2-methyl-5-ethylmorpholine,
N-(4-chloro-1-methylpentyl)-3,3-dimethylmorpholine,
N-(2-chloropropyl)thiomorpholine,
N-(5-chlorohexyl)-3-methylthiomorpholine,
N-(2-chloroethyl)-2,2-dipentylthiomorpholine,
and the like.

Examples of X—$C_nH_{2n}$—$R_6$ bromides and iodides suitable for this reaction are the bromides and iodides corresponding to each of the above chlorides.

These X—$C_nH_{2n}$—$H_a$ organic halides are either known in the art or can be prepared by methods known in the art [e.g., U.S. Patents 2,483,998; 2,584,131; 2,590,125; and 2,608,574; J. Am. Chem. Soc. 68, 1516–23 (1946); J. Am. Chem. Soc. 68, 1556–9 (1946); J. Am. Chem. Soc. 68, 1579–84 (1946); J. Am. Chem. Soc. 68, 2592–2600 (1946); J. Am. Chem. Soc. 69, 1258–60 (1947); J. Am. Chem. Soc. 70, 3100–2 (1948); J. Am. Chem. Soc. 71, 3988–90 (1949); J. Am. Chem. Soc. 74, 653–6 (1952); J. Am. Chem. Soc. 75, 2072–4 (1953); J. Am. Chem. Soc. 77, 2855–60 (1955); and Helv. Chim. Acta 37, 472–83 (1954)].

Either type of organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture or described above as being useful in its preparation. It is particularly advantageous to use a solvent for this purpose when the organic halide is a solid at room temperature. Although only one molecular equivalent of the organic halide is required for reaction with one molecular equivalent of the metallo-organic reaction product (preferably calculated on the basis of the amount of 1,3-dihydro-2H-azepin-2-one used to prepare the latter), it is preferred to use an excess of the organic halide, for example, about 1.01 to about 5 or even more molecular equivalents of the halide per molecular equivalent of the metallo-organic reaction product. Particularly preferred is the use of about 1.05 to about 2 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. Suitable reaction temperatures range from about 0° to about 200° C., preferably from about 10° to about 75° C. Usually, reaction temperatures ranging from about 25° to about 75° C. and reaction times ranging from about 1 to about 20 hours are satisfactory. Before starting the mixing of the metallo-organic reaction mixture and the organic halide, it is desirable to cool the former, for example, externally with ice, to within a range of about 0° to about 25° C., preferably to within a range of about 5° to about 15° C. After the mixing is complete, the temperature of the reaction mixture is caused to rise to a suitable reaction temperature as discussed above. The desired 1,3-dihydro-2H-azepin-2-one of Formula VIII or Formula X can be isolated from the reaction mixture by conventional methods, for example, by removal of reaction solvent by evaporation or distillation. If an alkali metal halide is present as a solid in the reaction mixture, it may with advantage be removed by filtration before the desired organic reaction product is isolated.

In the reaction of lithium aluminum hydride with 1,3-dihydro-2H-azepin-2-ones, the stoichiometric amounts of reactants correspond to 0.75 mole of lithium aluminum hydride and one mole of a Formula IX 1,3-dihydro-2H-azepin-2-one, and to 0.5 mole of lithium aluminum hydride and one mole of a Formula VIII or Formula X (Formula VII wherein $R_4$ is not hydrogen) 1,3-dihydro-2H-azepin-2-one. However, it is preferred to use an excess of the lithium aluminum hydride, advantageously about 50 to about 300 percent excess. A larger excess can be used but there is little if any advantage in doing so.

The reaction between lithium aluminum hydride and 1,3-dihydro-2H-azepin-2-one is preferably carried out by adding a diethyl ether solution of the latter reactant to a slurry of the lithium aluminum hydride in diethyl ether and then refluxing the resulting reaction mixture for about one to about 10 hours, the optimum time being dependent on the nature of the organic reactant. It is important to exclude oxygen from the reaction mixture. This can be accomplished by passing a slow stream of an inert gas, for example, nitrogen or helium, through the reaction vessel during the reflux period. It is also important to exclude substantial amounts of moisture from the reaction mixture. The use of dry solvents, reactants, and reaction vessels is preferred.

The first step in the isolation of the desired reaction product from the final lithium aluminum hydride reaction mixture involves addition of water and a base, preferably an alkali metal hydroxide such as sodium hydroxide, to the reaction mixture. 1,3-dihydro-2H-azepines tend to decompose in the presence of substantial amounts of water and it is preferred generally to use the minimum amount of water for this step. It is usually preferred to cool the final reaction mixture externally with ice, and then to add with stirring successively about 1 ml. of water, about 1 ml. of 25 percent aqueous sodium hydroxide solution, and about 3 ml. of water for each gram of lithium aluminum hydride originally used in the reaction mixture. When these amounts of water and sodium hydroxide solution are used, the aluminate salts usually precipitate in the form of a granular solid with no separate aqueous phase. The solid precipitate is readily separated from the organic solution by filtration or centrifugation. The free base form of the desired organic product can then be isolated by evaporation of the solvent.

1,3-dihydro-2H-azepines of Formula IV wherein $R_4$ is hydrogen are usually solids, and can be purified by recrystallization or precipitation from a suitable solvent or mixture of solvents. 1,3-dihydro-2H-azepines of Formula IV wherein $R_4$ is as given above but not hydrogen, or of Formula VI are usually liquids, and usually can be purified by distillation at reduced pressure. Alternative methods of purification for either type of 1,3-dihydro-2H-azepine are partition between the phases of a non-aqueous two-phase solvent system or chromatography. Frequently, however, the lithium aluminum hydride reaction produces 1,3-dihydro-2H-azepines of sufficient purity that a purification step is unnecessary before subsequent reaction with the Formula V maleimide. Indeed, the novel 1,3-dihydro-2H-azepine intermediates of this invention tend to be less stable to air and moisture than other organic compounds, and it is usually advantageous to prepare them shortly before transformation to the desired 2-azabicyclo-[3.2.2.]non-6-ene-8,9-dicarboximides of Formulas I or II, and to minimize exposure to air and moisture.

The reaction between a Formula IV or Formula VI, 1,3-dihydro-2H-azepine and a maleimide of Formula V is carried out by mixing these two reactants. Ordinarily, it is preferred to react approximately equimolecular amounts of the two reactants to avoid the necessity of subsequent separation of the excess reactant from the desired adduct of Formula I or Formula II. However, an excess of either reactant can be used, for example, about 1.1 to about 3 or even more molecular equivalents of one reactant per molecular equivalent of the other reactant, and in some cases, such an excess is advantageous, especially when the reaction is slow and the yield of desired product relatively small when equimolecular amounts of reactants are used. Usually, however, the reaction rate and yield of adduct are high enough so that there is no advantage in using an excess of either reactant. Although it is not essential to use a reaction solvent, especially when the Formula IV or Formula VI reactant is a liquid within the preferred reaction temperature range, it is preferred that a solvent be present in the reaction mixture. Suitable solvents include normally liquid aromatic hydrocarbons, e.g., benzene, toluene, xylene, and cumene; ethers, e.g., diethyl ether, tetrahydrofuran, and dioxane; and such solvents as chlorobenzene, tetrahydronaphthalene, and cyclohexane. Two criteria for a suitable solvent are that both reactants be moderately soluble therein and that the solvent not react with either reactant.

The reaction between the Formula V maleimide and the Formula IV or Formula VI 1,3-dihydro-2H-azepine is usually exothermic. It is preferred to add a solution of the 1,3-dihydro-2H-azepine rapidly to a solution of the maleimide, keeping the resulting mixture in the range about 10° to about 35° C. with external cooling if necessary. The initial color of the reaction mixture is usually red. This color then gradually fades to a pale shade of yellow or orange as the reaction proceeds. After the addition is complete, the mixture is allowed to stand or is stirred in the range about 0° to about 100° C. until the desired reaction is complete. Usually the reaction proceeds at a satisfactory rate in the range about 10° to about 50° C. At lower temperature, the reaction rate tends to be inconveniently slow. At higher temperatures, the yield of the desired Formula I or Formula II product tends to be lower than within the preferred reaction temperature range.

The time required for completion of the reaction will vary according to such factors as the reactivities of the two reactants, the reaction temperature, and the nature of the reaction solvent. The usual inverse relationship between reaction time and reaction temperature is observed. At about 25° C., the reaction usually requires from about one-half to about 36 hours.

After the reaction between the maleimide and the 1,3-dihydro-2H-azepine is complete, the Formula I or Formula II product can be isolated by conventional techniques, for example, by evaporation of the solvent under reduced pressure. Formula I products are usually solids at normal temperature. The Formula II products can be solids or liquids. The solids can be purified by recrystallization from a suitable solvent or mixture of solvents. The liquids can be purified by reduced pressure distillation. Chromatography is also a useful technique for purification of these products.

The free base form of a Formula I or a Formula II 2-azabicyclo[3.2.2]non-6-ene-8,9-dicarboximide is produced by the above reaction between the maleimide and the 1,3-dihydro-2H-azepine. The Formula I free bases can be transformed to monoacid addition salts and the Formula II free bases to either mono- or diacid addition salts by neutralization with the appropriate amount of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I or Formula II amine, the acid, and the acid addition salt. If the acid is soluble in water, the basic compound of Formula I or Formula II can be dissolved in water containing an equivalent amount of the acid, and thereafter, the water can be removed by evaporation. If the acid is soluble in a relatively non-polar solvent, for example, diethyl ether or diisopropyl ether, separate solutions of the acid and the Formula I or Formula II compound in such a solvent can be mixed in equivalent amounts, whereupon the monoacid addition salt will usually precipitate because of its relatively low solubility in the non-polar solvent. Alternatively, the basic Formula I or Formula II compound can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the monoacid addition salt. When it is desired to prepare a diacid addition salt of a Formula II free base, at least two equivalents of acid is used in one of the above procedures rather than the one equivalent specified above. The acid addition salt is usually a solid and can be purified by recrystallization from a suitable solvent or mixture of solvents. The acid addition salt can be transformed back to the free base by treatment with a base, e.g., sodium hydroxide. In some instances, the Formula I or Formula II compound is more easily purified in acid addition salt form than in free base form. Transformation back to the free base form thus completes a means of obtaining a particularly pure free base.

The novel 2-azabicyclo[3.2.2]non-6-ene-8,9-dicarboximides of Formula III are prepared by reacting the corresponding Formula I 2-azabicyclo[3.2.2]non-6-ene-8,9-dicarboximide, wherein $R_4$ is hydrogen, with a carboxylic acid anhydride of the formula:

(XI)

wherein $R_9$ is selected from the group consisting of hydrogen and alkyl of 1 to 4 carbon atoms, inclusive, and wherein $R_{10}$ is alkyl of 1 to 4 carbon atoms, inclusive. When $R_7$ of the desired Formula III product is alkyl, $R_9$ and $R_{10}$ of the Formula XI anhydride should be alike. If $R_9$ is a different alkyl than $R_{10}$, a mixture of Formula III products will be produced, because part of the $R_7$ alkyl moieties therein will originate in $R_9$ of the anhydride, and part in $R_{10}$ of the anhydride. When $R_7$ of the desired Formula III product is hydrogen, $R_9$ of the anhydride should be hydrogen. In that event, it is preferred that $R_{10}$ be methyl. A Formula III product wherein $R_7$ is hydrogen is the main product, and in some instances the exclusive product, of the interaction of the Formula I reactant and this mixed anhydride of formic and acetic acid.

Anhydrides of Formula XI are known in the art. With particular regard to the anhydride wherein $R_9$ is hydrogen and $R_{10}$ is methyl, see Huffman, J. Org. Chem. 23, 727–9 (1958).

The transformation of the Formula I reactant ($R_4$ is hydrogen) to the Formula III product is carried out by mixing the Formula I reactant with at least an equimolecular amount of the Formula XI anhydride and heating until no further reaction takes place. An inert reaction solvent, for example, benzene or diethyl ether, can be added, but it is preferred that an excess of the anhydride be used as the diluent. Satisfactory results are usually obtained by use of about 10 to about 30 moles of anhydride per mole of Formula I reactant. The mixture is heated, preferably in the range about 35° to about 125° C. for about one to about 24 hours. Satisfactory results are usually obtained with Formula XI anhydrides wherein $R_9$ and $R_{10}$ are both alkyl by heating at about 100° C. for about 1 to about 5 hours. Lower reaction temperatures, for example about 35° to about 60° C. are preferred when $R_9$ in the anhydride is hydrogen.

The desired Formula III product can be isolated from the reaction mixture by conventional techniques, for example, by removal of excess anhydride by distillation at reduced pressure. It is often sufficient merely to cool the reaction mixture, for example to the range about —10° to about 25° C. whereupon the desired Formula III product will precipitate. It is preferred to protect the reaction mixture from atmospheric moisture during the heating and isolation stages. The isolated Formula III product can be purified, if desired, by conventional techniques, for example, by recrystallization from a suitable solvent or mixture of solvents, or by chromatography.

The invention can be more fully understood by the following examples.

EXAMPLE 1

*1,3-dihydro-3,5,7-trimethyl-2H-azepin-2-one*

Following the procedure of Theilacker et al., supra, the sodium salt of 2,4,6-trimethylphenol was reacted with chloramide in the presence of an excess of this phenol. 1,3 - dihydro - 3,5,7-trimethyl-2H-azepin-2-one was obtained; M.P. 132° C.

Following the procedure of example 1 but substituting for the 2,4,6-trimethylphenol, 2,6-dimethylphenol;
2,6-diethylphenol;
2,6-dipropylphenol;
2,6-diisopropylphenol;
2,6-diisobutylphenol;
2,6-dibutylphenol;
2,4,6-triethylphenol;
2,6-diethyl-4-methylphenol;
2,6-dimethyl-4-ethylphenol;
4-tert-butyl-2,6-dimethylphenol;
2,6-diisopropyl-4-methylphenol;
2,6-diisobutyl-4-propylphenol;
4-sec-butyl-2,6-dimethylphenol; and
2,4,6-triisopropylphenol, there are obtained
1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one, respectively.

EXAMPLE 2

*1,3-dihydro-1,3,5,7-tetramethyl-2H-azepin-2-one*

A 51.5% sodium hydride suspension in mineral oil (9.0 g.; equivalent to 0.19 mole of sodium hydride) was added to a solution of 1,3-dihydro-3,5,7-trimethyl-2H-azepin-2-one (29.0 g.; 0.19 mole) in 150 ml. of dimethylformamide. The mixture was stirred at 50° C. for 1 hour. After cooling, methyl iodide (42.6 g.; 0.30 mole) was added in two portions. After stirring for 1 hour 250 ml. of diethyl ether was added and the resulting slurry was filtered. The oil remaining after evaporation of the solvent in the filtrate was distilled to yield 29.45 g. of a colorless liquid; B.P. 115–120° C. at 11 mm. Redistillation gave 1,3-dihydro-1,3,5,7-tetramethyl-2H-azepin-2-one; B.P. 121.5° C. at 13 mm.; $n_D^{24}$ 1.5198.

*Analysis.*—Calcd. for $C_{10}H_{15}NO$: C, 72.69; H, 9.15; N 8.48. Found: C, 72.32; H, 9.26; N. 8.59.

Following the procedure of Example 2 but substituting for the methyl iodide, isopropyl chloride;
propyl iodide;
isobutyl bromide;
pentyl bromide;
hexyl chloride;
allyl bromide;
2-methyl-2-butenyl bromide;
4-methyl-2-pentenyl chloride;
2-propynyl bromide;
3-pentynyl chloride;
cyclopentyl chloride;
cyclohexyl bromide;
4-tert-butylcyclohexyl chloride;
benzyl bromide; and
1-naphthylmethyl chloride, there are obtained
1,3-dihydro-1-isopropyl-3,5,7-trimethyl-2H-azepin-2-one;
1,3-dihydro-1-propyl-3,5,7-trimethyl-2H-azepin-2-one;
1,3-dihydro-1-isobutyl-3,5,7-trimethyl-2H-azepin-2-one;
1,3-dihydro-1-pentyl-3,5,7-trimethyl-2H-azepin-2-one;
1,3-dihydro-1-hexyl-3,5,7-trimethyl-2H-azepin-2-one;
1,3-dihydro-1-allyl-3,5,7-trimethyl-2H-azepin-2-one;
1,3-dihydro-1-(2-methyl-2-butenyl)-3,5,7-trimethyl-2H-azepin-2-one;
1,3-dihydro-1-(4-methyl-2-pentenyl)-3,5,7-trimethyl-2H-azepin-2-one;
1,3-dihydro-1-(2-propynyl)-3,5,7-trimethyl-2H-azepin-2-one;
1,3-dihydro-1-(3-pentynyl)-3,5,7-trimethyl-2H-azepin-2-one;
1,3-dihydro-1-cyclopentyl-3,5,7-trimethyl-2H-azepin-2-one;
1,3-dihydro-1-cyclohexyl-3,5,7-trimethyl-2H-azepin-2-one;
1,3-dihydro-1-(4-tert-butylcyclohexyl)-3,5,7-trimethyl-2H-azepin-2-one;
1,3-dihydro-1-benzyl-3,5,7-trimethyl-2H-azepin-2-one; and
1,3-dihydro-1-(1-naphthylmethyl)-3,5,7-trimethyl-2H-azepin-2-one, respectively.

Following the procedure of Example 2 but substituting for the combination of 1,3-dihydro-3,5,7-trimethyl-2H-azepin-2-one and methyl iodide as reactants, 1,3-dihydro-3,7-dimethyl-2H-azepin-2-one plus isopropyl chloride;
1,3-dihydro-3,7-dimethyl-2-H-azepin-2-one plus cyclopentyl chloride;
1,3-dihydro-3,7-diethyl-2H-azepin-2-one plus benzyl bromide;
1,3-dihydro-3,7-diethyl-2H-azepin-2-one plus allyl bromide ,3-dihydro-3,7-dipropyl-2H-azepin-2-one plus propyl iodide;
,3-dihydro-3,7-diisopropyl-2H-azepin-2-one plus 4-tert-butylcyclohexyl chloride;
,3-dihydro-3,7-diisobutyl-2H-azepin-2-one plus propyl bromide;
,3-dihydro-3,7-dibutyl-2H-azepin-2-one plus pentyl bromide;
,3-dihydro-3,5,7-triethyl-2H-azepin-2-one plus 2-propynyl bromide;
,3-dihydro-3,7-diethyl-5-methyl-2H-azepin-2-one plus benzyl bromide;
,3-dihydro-3,7-dimethyl-5-ethyl-2H-azepin-2-one plus hexyl chloride;
,3-dihydro-5-tert-butyl-3,7-dimethyl-2H-azepin-2-one plus 1-naphthylmethyl chloride;
,3-dihydro-3,7-diisopropyl-5-methyl-2H-azepin-2-one plus allyl bromide;
,3-dihydro-3,7-diisobutyl-5-propyl-2H-azepin-2-one plus propyl iodide;
,3-dihydro-5-sec-butyl-3,7-dimethyl-2H-azepin-2-one plus 2-propynyl bromide; and
,3-dihydro-3,5,7-triisopropyl-2H-azepin-2-one plus isopropyl chloride, here are obtained ,3-dihydro-3,7-dimethyl-1-isopropyl-2H-azepin-2-one;
,3-dihydro-1-cyclopentyl-3,7-dimethyl-2H-azepin-2-one;
,3-dihydro-1-benzyl-3,7-diethyl-2H-azepin-2-one;
,3-dihydro-1-allyl-3,7-diethyl-2H-azepin-2-one;
,3-dihydro-1,3,7-tripropyl-2H-azepin-2-one;
,3-dihydro-1-(4-tert-butylcyclohexyl)-3,7-diisopropyl-2H-azepin-2-one;
,3-dihydro-3,7-diisobutyl-1-propyl-2H-azepin-2-one;
,3-dihydro-3,7-dibutyl-1-pentyl-2H-azepin-2-one;
,3-dihydro-1-(2-propynyl)-3,5,7-triethyl-2H-azepine-2-one;
,3-dihydro-1-benzyl-3,7-diethyl-5-methyl-2H-azepin-2-one;
,3-dihydro-3,7-dimethyl-5-ethyl-1-hexyl-2H-azepin-2-one;
,3-dihydro-5-tert-butyl-3,7-dimethyl-1-(1-naphthylmethyl)-2H-azepin-2-one;
,3-dihydro-1-allyl-3,7-diisopropyl-5-methyl-2H-azepin-2-one;
,3-dihydro-3,7-diisobutyl-1,5-dipropyl-2H-azepin-2-one;
,3-dihydro-5-sec-butyl-3,7-dimethyl-1-(2-propynyl)-2H-azepin-2-one; and
,3-dihydro-1,3,5,7-tetra-isopropyl-2H-azepin-2-one, espectively.

EXAMPLE 3

*1,3-dihydro-1-(2-diethylaminoethyl)-3,5,7-trimethyl-2H-azepin-2-one*

A 51.5% sodium hydride suspension in mineral oil 2.33 g.; equivalent to 0.05 mole of sodium hydride) was added to a solution of 1,3-dihydro-3,5,7-trimethyl-2H-zepin-2-one (7.6 g.; 0.05 mole) in 50 ml. of dimethylormamide. The mixture was stirred at 50° C. for 1 hour. After cooling to 5–10° C., a solution of N-(2-chloroethyl) liethylamine (7.05 g.; 0.052 mole) in 10 ml. of xylene vas added. After stirring at about 25° C. for 1.5 hours, 50 ml. of diethyl ether was added and the resulting slurry vas filtered. The residue remaining after evaporation of he solvent in the filtrate was distilled to yield 10.8 g. of ,3-dihydro-1-(2-diethylaminoethyl)-3,5,7-trimethyl - 2H-zepin-2-one as a very pale yellow liquid; B.P. 123° C. t 0.3 mm.; $n_D^{25}$ 1.5002.

EXAMPLE 4

*1,3-dihydro-1-(3-dimethylaminopropyl)-3,5,7-trimethyl-2H-azepin-2-one*

The procedure of Example 3 was followed except that n place of N-(2-chloroethyl)diethylamine, there was used N-(3-chloropropyl)dimethylamine (6.1 g.; 0.05 mole). There was obtained 2.50 g. of 1,3-dihydro-1-(3-dimethylaminopropyl)-3,5,7-trimethyl-2H-azepin-2-one as a pale yellow liquid; B.P. 121–127° C. at 0.3 mm.

Following the procedure of Example 3 but substituting for the N-(2-chloroethyl)diethylamine, N-(2-bromoethyl)dimethylamine;
N-(2-iodoethyl)diisopropylamine;
N-(2-chloroethyl)-N-ethyl-2-methylbutylamine;
N-(2-chloroethyl)dipentylamine;
N-(3-bromopropyl)diethylamine;
N-(3-bromopropyl)-N-methylpentylamine;
N-(3-chloropropyl)dibutylamine;
N-(2-iodopropyl)-N-methylisopropylamine;
N-(3-bromobutyl)-N-methylbutylamine;
N-(5-bromopentyl)dimethylamine;
N-(6-chlorohexyl)dihexylamine;
N-(3-iodo-1,2-dimethylpropyl)dibutylamine; and
N-(4-chloro-1-methylpentyl)-N-methylethylamine, there are obtained 1,3-dihydro-1-(2-dimethylaminoethyl)-3,5,7-trimethyl-2H-azepin-2-one;
1,3-dihydro-1-(2-diisopropylaminoethyl)-3,5,7-trimethyl-2H-azepin-2-one;
1,3-dihydro-1-[2-(N-ethyl-2-methylbutylamino)-ethyl]-3,5,7-trimethyl-2H-azepin-2-one;
1,3-dihydro-1-[2-dipentylamino)ethyl]-3,5,7-trimethyl-2H-azepin-2-one;
1,3-dihydro-1-(3-diethylaminopropyl)-3,5,7-trimethyl-2H-azepin-2-one;
1,3-dihydro-1-[3-(N-methylpentylamino)propyl]-3,5,7-trimethyl-2H-azepin-2-one;
1,3-dihydro-1-[3-(dibutylamino)propyl]3,5,7-trimethyl-2H-azepin-2-one;
1,3-dihydro-1-[1-methyl-2-(N-methylisopropylamino)ethyl]-3,5,7-trimethyl-2H-azepin-2-one;
1,3-dihydro-1-[1methyl-3-(N-methylbutylamino)propyl]-3,5,7-trimethyl-2H-azepin-2-one;
1,3-dihydro-1-(5-dimethylaminopentyl)-3,5,7-trimethyl-2H-azepin-2-one;
1,3-dihydro-1-(6-dihexylaminohexyl)-3,5,7-trimethyl-2H-azepin-2-one;
1,3-dihydro-1-[2-methyl-3-(dibutylamino)butyl]-3,5,7-trimethyl-2H-azepin-2-one; and
1,3-dihydro-1-[1-methyl-4-(N-methylethylamino)pentyl]-3,5,7-trimethyl-2H-azepin-2-one.

respectively.

Following the procedure of Example 3 but substituting for the combination of 1,3-dihydro-3,5,7-trimethyl-2H-azepin-2-one and N-(2-chloroethyl)diethylamine as reactants, 1,3-dihydro-3,7-dimethyl-2H-azepin-2-one plus N-(2-bromoethyl)dimethylamine;
1,3-dihydro-3,7-dimethyl-2H-azepin-2-one plus N-(2-iodoethyl)dipropylamine;
1,3-dihydro-3,7-diethyl-2H-azepin-2-one plus N-(2-bromoethyl)dipentylamine;
1,3-dihydro-3,7-dipropyl-2H-azepin-2-one plus N-(3-bromopropyl)diisopropylamine;
1,3-dihydro-3,7-diisobutyl-2H-azepin-2-one plus N-(3-iodo-1-methylpropyl)dibutylamine;
1,3-dihydro-3,7-dibutyl-2H-azepin-2-one plus N-(2-chloro-1-methylpropyl)dibutylamine;
1,3-dihydro-3,5,7-triethyl-2H-azepin-2-one plus N-(5-bromopentyl)dimethylamine;
1,3-dihydro-3,7-diethyl-5-methyl-2H-azepin-2-one plus N-(6-chlorohexyl)dihexylamine;
1,3-dihydro-3,7-dimethyl-5-ethyl-2H-azepin-2-one plus N-(4-bromo-1-methylpentyl)-N-methylethylamine;
1,3-dihydro-3,7-diisopropyl-5-methyl-2H-azepin-2-one plus N-(2-bromoethyl)diethylamine; and
1,3-dihydro-3,5,7-triisopropyl-2H-azepin-2-one plus N-(2-bromoethyl)diisopropylamine, there are obtained
1,3-dihydro-1-(2-dimethylaminoethyl)-3,7-dimethyl-2H-azepin-2-one;

1,3-dihydro-1-(2-dipropylaminoethyl)-3,7-dimethyl-2H-azepin-2-one;
1,3-dihydro-1-(2-dipentylaminoethyl)-3,7-diethyl-2H-azepin-2-one;
1,3-dihydro-1-(3-diisopropylaminopropyl)-3,7-dipropyl-2H-azepin-2-one;
1,3-dihydro-1-(3-dibutylaminobutyl)-3,7-diisobutyl-2H-azepin-2-one;
1,3-dihydro-1-(1-methyl-2-dibutylaminopropyl)-3,7-dibutyl-2H-azepin-2-one;
1,3-dihydro-1(5-dimethylaminopentyl)-3,5,7-triethyl-2H-azepin-2-one;
1,3-dihydro-1-(6-dihexylaminohexyl)-3,7-diethyl-5-methyl-2H-azepin-2-one;
1,3-dihydro-1-[1-methyl-4-(N-methylethylamino-)pentyl]-3,7-dimethyl-5-ethyl-2H-azepin-2-one;
1,3-dihydro-2-(2-diethylaminoethyl)-3,7-diisopropyl-5-methyl-2H-azepin-2-one; and
1,3-dihydro-1-(2-diisopropylaminoethyl)-3,5,7-triisopropyl-2H-azepin-2-one, respectively.

EXAMPLE 5

*1,3-dihydro-1-[2-(1-pyrrolidinyl)ethyl]-3,5,7-trimethyl-2H-azepin-2-one*

A 51.5% sodium hydride suspension in mineral oil (4.65 g.; equivalent to 0.10 mole of sodium hydride) was added in several portions to a solution of 1,3-dihydro-3,5,7-trimethyl-2H-azepin-2-one (15.1 g.; 0.10 mole) in 100 ml. of dimethylformamide. The mixture was stirred at 55° C. for 30 minutes. After cooling to 10° C., a solution of N-(2-chloroethyl)pyrrolidine in an equal weight of toluene (32 g. of solution; equivalent to 0.12 mole of halide) was added in a thin stream, the resulting mixture being kept below 20° C. by external cooling. When the addition was complete, the mixture was stirred for an additional 1.5 hours at 25° C. Diethyl ether (about 200 ml.) was then added and the resulting slurry was filtered. The residue remaining after evaporation of the solvent in the filtrate was distilled to yield 18.2 g. of 1,3-dihydro-1-[2-(1-pyrrolidinyl)ethyl]-3,5,7-trimethyl-2H-azepin-2-one; B.P. 126–138° C. at 0.13 mm.; $n_D^{25}$ 1.6693.

EXAMPLE 6

*1,3-dihydro-1-[2-(2,2,4-trimethyl-1-pyrrolidinyl)-ethyl]-3,5,7-trimethyl-2H-azepin-2-one*

The procedure of Example 5 was followed except that in place of N-(2-chloroethyl)pyrrolidine, there was used N-(2-chloro-1-methylethyl)pyrrolidine (35.4 g. of a 50% a 50% toluene solution; equivalent to 0.12 mole of halide). There was obtained 26.7 g. of 1,3-dihydro-1-[2(2,2,4 - trimethyl - 1 - pyrrolidinyl)ethyl] - 3,5,7 - trimethyl-2H-azepin-2-one; B.P. 136–147° C. at 0.2 mm.; $n_D^{25}$ 1.5034; B.P. on redistillation 150° C. at 0.5 mm.; $n_D^{25}$ 1.5040.

EXAMPLE 7

*1,3-dihydro-1-[2-(1-pyrrolidinyl)propyl]-3,5,7-trimethyl-2H-azepin-2-one*

The procedure of Example 5 was followed except that in place of N-(2-chloroethyl)pyrrolidine, there was used N-(2-chloroethyl)morpholine (36.0 g. of a 50% toluene toluene solution; equivalent to 0.12 mole of halide). There was obtained 24.1 g. of 1,3-dihydro-1-[2-(1-pyrrolidinyl)propyl] - 3,5,7 - trimethyl - 2H - azepin - 2-one; B.P. 129–150° C. at 0.3 mm.; $n_D^{25}$ 1.5233.

EXAMPLE 8

*1,3-dihydro-1-(2-morpholinoethyl)-3,5,7-trimethyl-2H-azepin-2-one*

The procedure of Example 5 was followed except that in place of N-(2-chloroethyl)pyrrolidine, there was used N-(2-chloroethyl)-2,2,4-trimethylpyrrolidine (42.2 g. of solution; equivalent to 0.12 mole of halide). There was obtained 20.6 g. of 1,3-dihydro-1-(2-morpholinoethyl)-3,5,7-trimethyl-2H-azepin-2-one; B.P. 150–158° C. at 0.15 mm.; $n_D^{25}$ 1.5233.

EXAMPLE 9

*1,3-dihydro-1-(3-piperidinopropyl)-3,5,7-trimethyl-2H-azepin-2-one*

The procedure of Example 5 was followed except that in place of N-(2-chloroethyl)pyrrolidine, there was used N-(3-chloropropyl)piperidine (38.8 g. of a 50% toluene solution; equivalent to 0.12 mole of halide). There was obtained 17.6 g. of 1,3-dihydro-1-(3-piperidinopropyl)-3,5,7-trimethyl-2H-azepin-2-one; B.P. 146–157° C. at 0.15 mm.; $n_D^{25}$ 1.5191.

EXAMPLE 10

*1,3-dihydro-1-[2-(1-hexahydroazepinyl)ethyl]-3,5,7-trimethyl-2H-azepin-2-one*

The procedure of Example 5 was followed except that in place of N-(2-chloroethyl)pyrrolidine, there was used N-(2-chloroethyl)hexahydroazepine (38.8 g. of a 50% toluene solution; equivalent to 0.12 mole of halide) There was obtained 23.7 g. of 1,3-dihydro-1-[2-(1-hexahydroazepinyl) - ethyl] - 3,5,7 - trimethyl - 2H - azepin 2-one; B.P. 136–164° C. at 0.20 mm.; $n_D^{25}$ 1.5244.

Following the procedure of Example 5 but substituting for the combination of 1,3-dihydro-3,5,7-trimethyl-2H-azepin-2-one and N-(2-chloroethyl)pyrrolidine as reactants,
1,3-dihydro-3,7-dimethyl-2H-azepin-2-one plus N-(2-bromoethyl)-aziridine;
1,3-dihydro-3,7-diethyl-2H-azepin-2-one plus N-(3-iodopropyl)azetidine;
1,3-dihydro-3,7-dipropyl-2H-azepin-2-one plus N-(4-chlorobutyl)-2-isohexylpyrrolidine;
1,3-dihydro-3,7-diisopropyl-2H-azepin-2-one plus N-(5-chloro-2-methylpentyl)-3,4-dioctylpyrrolidine;
1,3-dihydro-3,7-diisobutyl-2H-azepin-2-one plus N-(2-bromoethyl)-2-methylpiperidine;
1,3-dihydro-3,7-dibutyl-2H-azepin-2-one plus N-(4-chlorobutyl)-3-isopropylpiperidine;
1,3-dihydro-3,5,7-triethyl-2H-azepin-2-one plus N-(3-iodopropyl)-2-methyl-5-ethylpiperidine;
1,3-dihydro-3,7-diethyl-5-methyl-2H-azepin-2-one plus N-(3-chloro-1-methylpropyl)-3,3-dimethylhexahydroazepine;
1,3-dihydro-3,7-dimethyl-5-ethyl-2H-azepin-2-one plus N-(2-bromoethyl)-heptamethylenimine;
1,3-dihydro-5-tert-butyl-3,7-dimethyl-2H-azepin-2-one plus N-(3-iodopropyl)octamethylenimine;
1,3-dihydro-3,7-diisopropyl-5-methyl-2H-azepin-2-one plus N-(4-chloro-1-methylpentyl)-3,3-dimethylmorpholine;
and 1,3-dihydro-5-sec-butyl-3,7-dimethyl-2H-azepin-2-one plus N-(2-bromopropyl)thiomorpholine, there are obtained
1,3-dihydro-1-[2-(1-aziridinyl)ethyl]-3,7-dimethyl-2H-azepin-2-one;
1,3-dihydro-1-[3-(1-azetidinyl)propyl]-3,7-diethyl-2H-azepin-2-one;
1,3-dihydro-1-[4-(2-isohexyl-1-pyrrolidinyl)butyl]-3,7-dipropyl-2H-azepin-2-one;
1,3-dihydro-1-[5-(3,4-dioctyl-1-pyrrolidinyl)-4-methylpentyl]-3,7-diisopropyl-2H-azepin-2-one;
1,3-dihydro-1-[2-(2-methylpiperidino)ethyl]-3,7-diisobutyl-2H-azepin-2-one;
1,3-dihydro-1-[4-(3-isopropylpiperidino)butyl]-3,7-dibutyl-2H-azepin-2-one;
1,3-dihydro-1-[3-(2-methyl-5-ethylpiperidino)propyl]-3,5,7-triethyl-2H-azepin-2-one;
1,3-dihydro-1-[3-(3,3-dimethyl-1-hexahydroazepinyl)butyl]-3,7-diethyl-5-methyl-2H-azepin-2-one;
1,3-dihydro-1-[2-(1-heptamethylenimino)ethyl]-3,7-dimethyl-5-ethyl-2H-azepin-2-one;

1,3-dihydro-1-[3-(1-octamethylenimino)propyl]-5-tert-
butyl-3,7-dimethyl-2H-azepin-2-one;
1,3-dihydro-1-[1-methyl-4-(3,3-dimethylmorpholino)
pentyl]-3,7-diisopropyl-5-methyl-2H-azepin-2-one;
and 1,3-dihydro-1-(1-methyl-2-thiomorpholinoethyl)-5-
sec-butyl-3,7-dimethyl-2H-azepin-2-one, respectively.

EXAMPLE 11

*1,3-dihydro-3,5,7-trimethyl-2H-azepine*

1,3-dihydro-3,5,7-trimethyl-2H-azepin-2-one (15.1 g.; 0.10 mole) was added in four portions to a stirred slurry of lithium aluminum hydride (2.84 g.; 0.075 mole) in 150 ml. of anhydrous diethyl ether at about 25° C. during 10 minutes. The resulting mixture was refluxed with stirring for 3 hours while a slow stream of nitrogen was passed into the reaction flask. The reaction mixture was then cooled externally with ice and, with continued stirring, 3 ml. of water, 3 ml. of 25% aqueous sodium hydroxide solution, and 8 ml. of water were added in that order. Stirring was continued for about 5 minutes. The granular precipitate of aluminate salts was removed by filtration, and the filtrate was evaporated to give 1,3-dihydro-3,5,7-trimethyl-2H-azepine in the form of a very fluffy, white solid which appeared to be rather unstable.

Following the procedure of Example 11 but substituting for the 1,3-dihydro-3,5,7-trimethyl-2H-azepin-2-one,
1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,5,7-triethyl-2H-azepin-2-one;
1,3-dihydro-3,7-diethyl-5-methyl-2H-azepin-2-one;
1,3dihydro-3,7-dimethyl-5-ethyl-2H-azepin-2-one;
1,3-dihydro-5-tert-butyl-3,7-dimethyl-2H-azepin-2-one;
and 1,3-dihydro-3,7-diisopropyl-5-methyl-2H-azepin-2-
one, there are obtained 1,3-dihydro-3,7-dimethyl-2H-
azepine;
1,3-dihydro-3,7-diethyl-2H-azepine;
1,3-dihydro-3,7-dipropyl-2H-azepine;
1,3-dihydro-3,7-diisopropyl-2H-azepine;
1,3-dihydro-3,7-diisobutyl-2H-azepine;
1,3-dihydro-3,5,7-triethyl-2H-azepine;
1,3-dihydro-3,7-diethyl-5-methyl-2H-azepine;
1,3-dihydro-3,7-dimethyl-5-ethyl-2H-azepine;
1,3-dihydro-5-tert-butyl-3,7-dimethyl-2H-azepine; and
1,3-dihydro-3,7-diisopropyl-5-methyl-2H-azepine, respectively.

EXAMPLE 12

*1,3-dihydro-1,3,5,7-tetramethyl-2H-azepine*

1,3-dihydro-1,3,5,7-tetramethyl-2H-azepin-2-one (33.0 g.; 0.20 mole) was added in four portions to a stirred slurry of lithium aluminum hydride (7.6 g.;0.20 mole) in 200 ml. of anhydrous diethyl ether at about 25° C. during 10 minutes. The resulting mixture was refluxed with stirring for 3 hours while a slow stream of nitrogen gas was passed into the reaction flask. The reaction mixture was then cooled externally with ice and, with continued stirring, 8 ml. of water, 8 ml. of 25% aqueous sodium hydroxide solution, and 23 ml. of water were added in that order. Stirring was continued for about 5 minutes. The granular precipitate of inorganic salts was then removed by filtration, and the filtrate was evaporated to give a pale yellow oil which was distilled under reduced pressure to give 27.7 g. of 1,3-dihydro-1,3,5,7-tetramethyl-2H-azepine in the form of a colorless liquid which rapidly turned yellow; B.P. 50–54° C. at 1.0 mm.

U.V. (diethyl ether) 301 m$\mu$ ($\epsilon$=7,050).

I.R. (principal bands; CCl$_4$ solution) 1635 and 1595 cm.$^{-1}$.

EXAMPLE 13

*1,3-dihydro-1-ethyl-3,5,7-trimethyl-2H-azepine*

Following the procedure of Example 12, 1,3-dihydro-1-ethyl-3,5,7-trimethyl-2H-azepin-2-one (7.7 g.; 0.043 mole) was reacted with lithium aluminum hydride (1.6 g.; 0.043 mole) to give 5.6 g. of 1,3-dihydro-1-ethyl-3,5,7-trimethyl-2H-azepine in the form of a colorless liquid which slowly turned yellow; B.P. 61–64° C. at 1 mm.; $n_D^{23}$ 1.5176.

U.V. (diethyl ether) 305 m$\mu$ ($\epsilon$=7,500).

I.R. (principal bands; CCl$_4$ solution) 1635 and 1585 cm.$^{-1}$

Following the procedure of Example 12 but substituting for the 1,3-dihydro-1,3,5,7-tetramethyl-2H-azepin-2-one;
1,3-dihydro-1-allyl-3,5,7-trimethyl-2H-azepin-2-one;
1,3-dihydro-1-cyclopentyl-3,5,7-trimethyl-2H-azepin-2-
one;
1,3-dihydro-1-benzyl-3,7-diethyl-2H-azepin-2-one;
1,3-dihydro-1-(4-tert-butylcyclohexyl)-3,7-diisopropyl-
2H-azepin-2-one;
1,3-dihydro-3,7-dipropyl-1-hexyl-2H-azepin-2-one; and
1,3-dihydro-1-(2-propynyl)-3,5,7-triethyl-2H-azepin-2-
one,
there are obtained 1,3-dihydro-1-allyl-3,5,7-trimethyl-
2H-azepine;
1,3-dihydro-1-cyclopentyl-3,5,7-trimethyl-2H-azepine;
1,3-dihydro-1-benzyl-3,7-diethyl-2H-azepine;
1,3-dihydro-1-(4-tert-butylcyclohexyl)-3,7-diisopropyl-
2H-azepine;
1,3-dihydro-3,7-dipropyl-1-hexyl-2H-azepine; and
1,3-dihydro-1-(2-propylnyl)-3,5,7-triethyl-2H-azepine,
respectively.

EXAMPLE 14

*1,3-dihydro-1-(2-diethylaminoethyl)-3,5,7-
trimethyl-2H-azepine*

Following the procedure of example 12, 1,3-dihydro-1-(2-diethylaminoethyl)3,5,7-trimethyl-2H-azepin - 2 - one (7.5 g.; 0.03 mole) was reacted with lithium aluminum hydride (1.15 g.; 0.03 mole) to give 1,3-dihydro-1-(2-diethylaminoethyl)-3,5,7-trimethyl 2H-azepine.

EXAMPLE 15

*1,3-dihydro-1-(3-dimethylaminopropyl)-3,5,7-
trimethyl-2H-azepine*

Following the procedure of Example 12, 1,3-dihydro-1-(3-dimethylaminopropyl)-3,5,7 - trimethyl - 2H-azepin-2-one (7.1 g.; 0.03 mole) was reacted with lithium aluminum hydride (1.15 g.; 0.03 mole) to give 1,3-dihydro-1-(3-dimethylaminopropyl)-3,5,7-trimethyl-2H-azepine.

Following the procedure of Example 14 but substituting for the 1,3-dihydro-1-(2-diethylaminoethyl)-3,5,7-trimethyl-2H-
azepin-2-one,
1,3-dihydro-1-(4-dimethylaminobutyl)-3,5,7-trimethyl-
2H-azepin-2-one;
1,3-dihydro-1-(6-dihexylaminohexyl)-3,5,7-trimethyl-
2H-azepin-2-one;
1,3-dihydro-1-(2-dipentylaminoethyl)-3,7-diethyl-2H-
azepin-2-one;
1,3-dihydro-1-(5-dimethylaminopentyl)-3,5,7-triethyl-
2H-azepin-2-one; and
1,3-dihydro-1-[1-methyl-4-(N-methylethylamino)pentyl]-
3,7-dimethyl-5-ethyl-2H-azepin-2-one,
there are obtained 1,3-dihydro-1-(4-dimethylaminobutyl)-
3,5,7-trimethyl-2H-azepine;
1,3-dihydro-1-(6-dihexylaminohexyl)-3,5,7-trimethyl-
2H-azepine;
1,3-dihydro-1-(2-dipentylaminoethyl)-3,7-diethyl-2H-
azepine;
1,3-dihydro-1-(5-dimethylaminopentyl)-3,5,7-triethyl-
2H-azepine; and 1,3-dihydro-1-[1-methyl-4-(N-methylethylamino)pentyl]-3,7-dimethyl-5-ethyl-2H-azepine, respectively.

EXAMPLE 16

*1,3-dihydro-1-(2-morpholinoethyl)3,5,7-trimethyl-2H-azepine*

Following the procedure of Example 12, 1,3-dihydro-1-(2-morpholinoethyl)-3,5,7-trimethyl-2H-azepin-2-one (7.0 g.; 0.0275 mole) was reacted with lithium aluminum hydride (1.05 g.; 0.0275 mole) to give 1,3-dihydro-1-(2-morpholinoethyl)-3,5,7-trimethyl-2H-azepine.

EXAMPLE 17

*1,3-dihydro-1-[2-(1-pyrrolidinyl)ethyl]-3,5,7-trimethyl-2H-azepine*

Following the procedure of Example 12, 1,3-dihydro-1-[2-(1-pyrrolidinyl)ethyl]-3,5,7-trimethyl - 2H - azepin-2-one (7.4 g.; 0.03 mole) was reacted with lithium aluminum hydride (1.15 g.; 0.03 mole) to give 1,3-dihydro-1-[2-(1-pyrrolidinyl)ethyl]-3,5,7-trimethyl-2H-azepine.

EXAMPLE 18

*1,3-dihydro-1-[2-(2,2,4-trimethyl-1-pyrrolidinyl)-ethyl]-3,5,7-trimethyl-2H-azepine*

Following the procedure of Example 12, 1,3-dihydro-1-[2-(2,2,4-trimethyl - 1 - pyrrolidinyl)ethyl] - 3,5,7 - trimethyl-2H-azepin-2-one (8.70 g.; 0.03 mole) was reacted with lithium aluminum hydride (1.15 g.; 0.03 mole) to give 1,3 - dihydro-1-[2-(2,2,4 - trimethyl-1-pyrrolidinyl)-ethyl]-3,5,7-trimethyl-2H-azepine.

EXAMPLE 19

*1,3-dihydro-1-[2-(1-pyrrolidinyl)propyl]-3,5,7-trimethyl-2H-azepine*

Following the procedure of Example 12, 1,3-dihydro-1-[2-(1-pyrrolidinyl) propyl]-3,5,7-trimethyl-2H-azepin-2-one (7.9 g.; 0.03 mole) was reacted with lithium aluminum hydride (1.15 g.; 0.03 mole) to give 1,3-dihydro-1-[2-(1-pyrrolidinyl)-propyl]-3,5,7-trimethyl-2H-azepine.

EXAMPLE 20

*1,3-dihydro-1-(3-piperidinopropyl)-3,5,7-trimethyl-2H-azepine*

Following the procedure of Example 12, 1,3-dihydro-1-(3-piperidinopropyl)-3,5,7-trimethyl-2H-azepin - 2 - one (8.3 g.; 0.03 mole) was reacted with lithium aluminum hydride (1.15 g.; 0.03 mole) to give 1,3-dihydro-1-(3-piperidinopropyl)-3,5,7-trimethyl-2H-azepine.

EXAMPLE 21

*1,3-dihydro-1-[2(1-hexahydroazepinyl)ethyl]-3,5,7-trimethyl-2H-azepine*

Following the procedure of Example 12, 1,3-dihydro-1-[2-(1-hexahydroazepinyl)ethyl]-3,5,7 - trimethyl - 2H-azepin-2-one (8.3 g.; 0.03 mole) was reacted with lithium aluminum hydride (1.15 g.; 0.03 mole) to give 1,3-dihydro-1-[2-(1-hexahydroazepinyl)ethyl]-3,5,7 - trimethyl-2H-azepine.

Following the procedure of Example 16 but substituting for the 1,3-dihydro-1-(2-morpholinoethyl)-3,5,7-trimethyl-2H-azepin-2-one,
1,3-dihydro-1-[2-(1-aziridinyl)ethyl]-3,7-dimethyl-2H-azepin-2-one;
1,3-dihydro-1-[3-(1-azetidinyl)propyl]-3,7-diethyl-2H-azepin-2-one;
1,3-dihydro-1-[3-(2-methyl-5-ethyl-piperidino)propyl]-3,5,7-triethyl-2H-azepin-2-one;
1,3-dihydro-1-[2-(1-heptamethylenimino)ethyl]-3,7-dimethyl-5-ethyl-2H-azepin-2-one;
1,3-dihydro-1-[3-(1-octamethylenimino)propyl]-5-tert-butyl-3,7-dimethyl-2H-azepin-2-one; and
1,3-dihydro-1-(1-methyl-2-thiomorpholinoethyl)-5-sec-butyl-3,7-dimethyl-2H-azepin-2-one, there are obtained, 1,3-dihydro-1-[2-(1-aziridinyl)ethyl]-3,7-dimethyl-2H-azepine;
1,3-dihydro-1-[3-(1-azetidinyl)propyl]-3,7-diethyl-2H-azepine;
1,3-dihydro-1-[3-(2-methyl-5-ethylpiperidino)propyl]-3,5,7-triethyl-2H-azepine;
1,3-dihydro-1-[2-(1-heptamethylenimino)ethyl]-3,7-dimethyl-5-ethyl-2H-azepine;
1,3-dihydro-1-[3-(1-octamethylenimino)propyl]-5-tert-butyl-3,7-dimethyl-2H-azepine; and
1,3-dihydro-1-(1-methyl-2-thiomorpholinoethyl)-5-sec-butyl-3,7-dimethyl-2H-azepine, respectively.

Also following the procedures of Examples 11 and 12 each of the other 1,3-dihydro-2H-azepin-2-ones mentioned above is transformed to the corresponding 1,3-dihydro-2H-azepine.

EXAMPLE 22

*1,4,6-trimethyl-N-phenyl-2-azabicyclo[3.2.2]non-6-ene-8,9-dicarboximide*

A solution of 1,3-dihydro-3,5,7-trimethyl-2H-azepine prepared according to Example 11 from 15.1 g. (0.10 mole) of 1,3-dihydro-3,5,7-trimethyl-2H-azepin-2-one, in 50 ml. of benzene was added in one portion at about 25° C. to a benzene solution (75 ml.) of N-phenylmaleimide (17.3 g.; 0.10 mole). The initial red color of the reaction mixture rapidly faded to yellow as the exothermic reaction subsided. The mixture was allowed to stand about 17 hours at about 25° C. The benzene was then evaporated at reduced pressure, and the residue adsorbed on a 750-g. column of Florisil (60–100 mesh; a magnesium tri silicate; obtained from the Foridin Company, Tallahassee Fla.) and eluted first, with 4000 ml. of hexane, second with 5000 ml. of a mixture of hexane and diethyl ether (9:1), and third, with 7000 ml. of diethyl ether. Evaporation of the first eluate gave 4.1 g. of N-phenylmaleimide. Evaporation of the second eluate gave 3.0 g. of the 1,3-dihydro-3,5,7-trimethyl-2H-azepin-2-one. Evaporation of the third eluate gave 3.9 g. of a solid; M.P. 121–122.5° C. Two recrystallizations of this last material from a mixture of diethyl ether and hexane gave 1,4,6-trimethyl - N - phenyl-2-azabicyclo[3.2.2]non-6-ene-8,9-dicarboximide in the form of white stars; M.P. 123.5-124.5° C.

*Analysis.*—Calcd. for $C_{19}H_{22}N_2O_2$: C, 73.52; H, 7.14 N, 9.03. Found: C, 73.49; H, 7.00; N, 8.89.

I.R. (principal bands; mineral oil mull) 3320, 1768 1709 cm.$^{-1}$.

Gradual addition of an ethereal solution of hydrogen chloride to an ethereal solution of 1,4,6-trimethyl-N phenyl - 2 - azabicyclo[3.2.2]non-6-ene-8,9-dicarboximide until fresh additions no longer caused precipitation, followed by filtration, gave 1,4,6-trimethyl-N-phenyl-2-azabicyclo[3.2.2]non-6-ene-8,9-dicarboximide hydrochloride When ethereal solutions of sulfuric acid, phosphoric acid benzoic acid, and salicylic acid are used in place o ethereal hydrogen chloride, the corresponding sulfuric phosphoric, benzoic, and salicylic acid addition salts ar obtained.

Following the procedure of Example 22 but using i place of N-phenylmaleimide, N-methylmalemide; N-butylmaleimide; N-p-tolylmaleimide; and N-(3,5-xylyl)maleimide, there are obtained 1,4,6-trimethyl-N-methyl-2-azabicyclo[3.2.2]non - 6 - ene-8,9-dicarboximide; 1,4,6-trimethyl - N - butyl-2-azabicyclo[3.2.2]non-6-ene-8,9-dicarboxamide; 1,4,6 - trimethyl-N-p-tolyl-2-azabicyclo[3.2.2] non-6-ene-8,9-dicarboximide; and 1,4,6-trimethyl-N-(3,5 xylyl) - 2-azabicyclo[3.2.2]non-6-ene-8,9-dicarboxamide respectively. Also following the procedure of Exampl 22, each of the above dicarboximides is transformed t the corresponding hydrochloric, sulfuric, phosphoric, ben zoic, and salicylic acid addition salts.

Following the procedure of Example 22 but substitut ing for the combination of 1,3-dihydro-3,5,7-trimethyl 2H-azepine and N-phenylmaleimide, 1,3-dihydro-3,7-di methyl-2H-azepine plus N-ethylmaleimide; 1,3-dihydro-3,7-diethyl-2H-azepine plus N-hexylmaleimide; 1,3-dihydro - 5-tert-butyl-3,7-dimethyl-2H-azepine plus N-o-tolylmaleimide; and 1,3-dihydro-3,5,7-triethyl-2H-azepine plus N-(2,4-xylyl)maleimide, there are obtained 1,4-dimethyl-N - ethyl-2-azabicyclo[3.2.2]non-6-ene-8,9-dicarboximide; 1,4 - diethyl-N-hexyl-2-azabicyclo[3.2.2]non-6-ene-8,9-dicarboximide; 6 - tert-butyl-1,4-dimethyl-N-o-tolyl-2-azabicyclo[3.2.2]non - 6 - ene-8,9-dicarboximide; and 1,4,6-triethyl - N - (2,4-xylyl)-2-azabicyclo[3.2.2]non-6-ene-8,9-dicarboximide, respectively.

Also, following the procedure of Example 22, each of the above dicarboximides is transformed to the corresponding hydrochloric, sulfuric, phosphoric, benzoic, and salicylic acid addition salts.

EXAMPLE 23

*1,2,4,6-tetramethyl-N-phenyl-2-azabicyclo[3.2.2]-non-6-ene-8,9-dicarboximide*

1,3 - dihydro - 1,3,5,7-tetramethyl-2H-azepine was prepared according to Example 12 from 8.3 g. (0.05 mole) of 1,3-dihydro-1,3,5,7-tetramethyl-2H-azepin-2-one (dissolved in 25 ml. of diethyl ether) and 2.1 g. (0.055 mole) of lithium aluminum hydride. The yellow oily product was not distilled but was dissolved in 35 ml. of benzene and added in one portion at about 25° C. to a dry benzene solution (40 ml.) of N-phenyl-maleimide (8.7 g.; 0.05 mole). The initial red color of the reaction mixture rapidly faded to yellow as the exothermic reaction subsided. The mixture was allowed to stand about 17 hours at about 25° C. The benzene was then evaporated at reduced pressure, and the residual gum adsorbed on a 1000-g. column of Florisil (60–100 mesh). Elution with diethyl ether and evaporation of the eluate gave a material which was recrystallized from a mixture of diethyl ether and hexane to give 10.3 g. of a pink solid; M.P. 94.5–96° C. Three additional recrystallizations from a mixture of diethyl ether and hexane gave 1,2,4,6-tetramethyl-N-phenyl-2-azabicyclo[3.2.2]non-6-ene-8,9-dicarboximide in the form of stout white prisms; M.P. 98–98.5° C.

*Analysis.*—Calcd. for $C_{20}H_{24}N_2O_2$: C, 74.04; H, 7.46; N, 8.64. Found: C, 74.39; H, 7.53; N. 8.42.

I.R. (principal bands; mineral oil mull) 1768 and 1705 cm.$^{-1}$.

Following the procedure of Example 22, the hydrochloride of 1,2,4,6 - tetramethyl-N-phenyl-2-azabicyclo-[3.2.2]non-6-ene-8,9-dicarboximide was prepared. When ethereal solutions of sulfuric acid, phosphoric acid, benzoic, acid, and salicylic acid are used in place of ethereal hydrogen chloride, the corresponding sulfuric, phosphoric, benzoic, and salicylic acid addition salts are obtained.

EXAMPLE 24

*2-ethyl-1,4,6-trimethyl-N-phenyl-2-azabicyclo[3.2.2]-non-6-ene-8,9-dicarboximide*

1,3-dihydro-1-ethyl-3,5,7-trimethyl-2H-azepine was prepared according to Example 13 from 7.8 g. (0.043 mole) of 1,3 - dihydro - 1-ethyl-3,5,7-trimethyl-2H-azepin-2-one and 1.82 g. (0.048 mole) of lithium aluminum hydride. The product was not distilled but was dissolved in 30 ml. of benzene and added in one portion to a dry benzene solution (50 ml.) of N-phenyl-maleimide (7.5 g.; 0.043 mole). The initial red color of the reaction mixture rapidly faded as the exothermic reaction subsided. The mixture was allowed to stand about 17 hours at about 25° C. The benzene was then evaporated at reduced pressure. The residue crystallized on addition of about 10 ml. of diethyl ether. Filtration gave 11.1 g. of a greyish solid; M.P. 145–148° C. Recrystallization from ethyl acetate gave 2-ethyl-1,4,6-trimethyl-N-phenyl-2-azabicyclo[3.2.2]non-6-ene-8,9-dicarboximide in the form of stout white prisms; M.P. 149–150° C.

*Analysis.*—Calcd. for $C_{21}H_{26}N_2O_2$: C, 74.52; H, 7.74; N, 8.28. Found: C, 74.76; H, 8.02; N, 8.17.

I.R. (principal bands; mineral oil mull) 1768 and 1705 cm.$^{-1}$.

Following the procedure of Example 22, the hydrochloride of 2-ethyl-1,4,6-trimethyl-N-phenyl-2-azabicyclo [3.2.2]non-6-ene-8,9-dicarboximide was prepared. When ethereal solutions of sulfuric acid, phosphoric acid, benzoic acid, and salicyclic acid are used in place of ethereal hydrogen chloride, the corresponding sulfuric, phosphoric, benzoic, and salicyclic acid addition salts are obtained.

Following the procedure of Example 23 or Example 24 but substituting for the particular combination of the 1,3-dihydro-2H-azepine and the maleimide used therein, 1,3 - dihydro - 1 - allyl - 3,5,7 - trimethyl - 2H - azepine plus N-propylmaleimide; 1,3 - dihydro - 1 - cyclopentyl-3,5,7-trimethyl-2H-azepine plus N-sec-butylmaleimide; 1,3-dihydro-1-benzyl-3,7-diethyl-2H-azepine plus N-p-ethylphenylmaleimide; 1,3 - dihydro-1-(4-tert-butylcyclohexyl)-3,7-diisopropyl-2H-azepine plus N-m-isopropylphenylmaleimide; 1,3 - dihydro-3,7-dipropyl-1-hexyl-2H-azepine plus N-(2,4-xylyl)maleimide; and 1,3-dihydro-1-(2-propynyl)-3,5,7-triethyl-2H-azepine plus N-phenylmaleimide, there are obtained 2-allyl-1,4,6-trimethyl-N-propyl-2-azabicyclo[3.2.2]non-6-ene-8,9-dicarboximide; 2-cyclopentyl-1,4,6-trimethyl-N-sec - butyl - 2 - azabicyclo[3.2.2]non - 6 - ene-8,9-dicarboximide; 2-benzyl-1,4-diethyl - N - p - ethylphenyl-2-azabicyclo[3.2.2]non-6-ene - 8,9 - dicarboximide; 2-(4-tert-butylcyclohexyl)-1,4-diisopropyl-N-m-isopropylphenyl-2-azabicyclo[3.2.2]non - 6 - ene-8,9-dicarboximide; 1,4 - dipropyl - 2-hexyl-N-(2,4-xylyl)-2-azabicyclo[3.2.2] non-6-ene-8,9-dicarboximide; and 2-(2-propynyl)1,4,6-triethyl-N-phenyl-2-azabicyclo[3.2.2]non - 6 - ene-8,9-dicarboximide, respectively. Also, following the procedure of Example 22, each of the above dicarboximides is transformed to the corresponding hydrochloric, sulfuric, phosphoric, benzoic, and salicylic acid addition salts.

EXAMPLE 25

*2-(2-diethylaminoethyl)-1,4,6-trimethyl-N-phenyl-2-azabicyclo[3.2.2]non-6-ene-8,9-dicarboximide*

A solution of N-phenylmaleimide (5.2 g.; 0.03 mole) in 35 ml. of benzene was added at about 25° C. to a benzene solution (25 ml.) of 1,3-dihydro-1-(2-diethylaminoethyl)-3,5,7-trimethyl-2H-azepine, prepared according to Example 14 from 7.5 g. (0.03 mole) of 1,3-dihydro-1-(2-diethylaminoethyl)-3,5,7-trimethyl-2H-azepin-2-one. The initial red color of the reaction mixture rapidly faded to yellow as the exothermic reaction subsided. The mixture was allowed to stand about 17 hours at about 25° C. The benzene was then evaporated at reduced pressure and the residual oil was dissolved in 6 normal hydrochloric acid. This aqueous acid solution was extracted with methylene chloride and then, with external cooling, was made basic with concentrated aqueous ammonia solution. The basic mixture was extracted with three 250-ml. portions of methylene chloride, and the combined extracts were dried, filtered, and evaporated to give 2-(2-diethylaminoethyl)-1,4,6-trimethyl-N-phenyl-2-azabicyclo[3.2.2]non - 6 - ene-8,9-dicarboximide in the form of an oil. This oil was dissolved in diethyl ether and to this solution was added ethereal hydrogen chloride until no further precipitate formed. Filtration gave 11.4 g. of a pale yellow powder; M.P. 163–169° C. Recrystallization from a mixture of water and acetone gave 2(2-diethylaminoethyl)-1,4,6-trimethyl-N-phenyl - 2 - azabicyclo [3.2.2]non-6-ene-8,9-dicarboximide dihydrochloride in the form of white prisms; M.P. 183° C.

*Analysis.*—Calcd. for $C_{25}H_{37}Cl_2N_3O_2$: C, 62.23; H, 7.73; N, 8.71. Found: C, 62.60; H, 8.03; N, 8.51.

I.R. (principal bands; mineral oil mull) 1770 and 1710 cm.$^{-1}$.

Use of one mole hydrogen chloride per mole of dicarboximide rather than 2 or more moles of hydrogen chloride gives the monohydrochloride. Use of sulfuric acid, phosphoric acid, benzoic acid, and salicyclic acid in place of the hydrogen chloride gives the corresponding sulfuric, phosphoric, benzoic, and salicylic mono- and diacid addition salts.

EXAMPLE 26

*2-(3-dimethylaminopropyl)-1,4,6-trimethyl-N-phenyl-2-azabicyclo[3.2.2]non-6-ene-8,9-dicarboximide*

Following the procedure of Example 25 but using the 1,3-dihydro-1-(3-dimethylaminopropyl) - 3,5,7 - trimethyl-2H-azepine prepared according to Example 15 in place of 1,3-dihydro-1-(2-diethylaminoethyl) - 3,5,7 - trimethyl-2H-azepine, there were obtained 2-(3-dimethylaminopropyl) - 1,4,6-trimethyl-N-phenyl-2-azabicyclo[3.2.2]non-6-ene-8,9-dicarboximide and its dihydrochloride.

Following the procedure of Example 25 but substituting for the particular combination of the 1,3-dihydro-2H-azepine and the maleimide used therein, 1,3-dihydro-1-(4 - dimethylaminobutyl)-3,5,7-trimethyl-2H-azepine plus N - methylmaleimide; 1,3-dihydro-1-(6-dihexylaminohexyl)-3,5,7-trimethyl-2H-azepine plus N-pentylmaleimide; 1,3-dihydro-1-(2-dipentylaminoethyl) - 3,7 - diethyl - 2H-azepine plus N-p-tolylmaleimide; 1,3-dihydro-1-(5-dimethylaminopentyl)-3,5,7-triethyl-2H-azepine plus N-p-butylphenylmaleimide; and 1,3-dihydro-1-[1-methyl-4-(N-methylethylamino)pentyl]-3,7-dimethyl - 5 - ethyl-2H-azepine plus N-(2,5-xylyl)maleimide, there are obtained 2 - (4 - dimethylaminobutyl)-1,4,6-trimethyl-N-methyl-2-azabicyclo[3.2.2]non-6-ene-8,9-dicarboximide; 2 - (6 - dihexylaminohexyl) - 3,5,7-trimethyl-N-pentyl-2-azabicyclo [3.2.2]non - 6-ene-8,9-dicarboximide; 1,4-diethyl-2-(2-dipentylaminoethyl - N - p - tolyl-2-azabicyclo[3.2.2]non-6-ene-8,9-dicarboximide; 2-(5-dimethylaminopentyl)-1,4,6-triethyl-N-p-butylphenyl-2-azabicyclo[3.2.2]non - 6 - ene-8,9-dicarboximide; and 1,4-dimethyl-6-ethyl-2-[1-methyl-4(N-methylethylamino)-pentyl] - N - (2,5-xylyl)-2-azabicyclo[3.2.2]non - 6 - ene - 8,9-dicarboximide, respectively. Also following the procedure of Example 25, each of the above dicarboximides is transformed to the corresponding hydrochloric, sulfuric, phosphoric, benzoic, and salicylic acid addition salts.

EXAMPLE 27

*2-(2-morpholinoethyl)-1,4,6-trimethyl-N-phenyl-2-azabicyclo[3.2.2]non-6-ene-8,9-dicarboximide*

A solution of N-phenylmaleimide (4.75 g.; 0.0275 mole) in 35 ml. of benzene was added at about 25° C. to a benzene solution (25 ml.) of 1,3-dihydro - 1 - (2-morpholinoethyl) - 3,5,7-trimethyl-2H-azepine, prepared according to example 16 from 7.0 g. (0.0275 mole) of 1,3 - dihydro - 1 - (2 - morpholinoethyl) - 3,5,7 - trimethyl-2H-azepin-2-one. The initial deep red color of the reaction mixture faded rapidly to pale orange as the exothermic reaction subsided. The mixture was allowed to stand about 17 hours at about 25° C. Following the procedure of Example 25, the desired adduct was isolated in free base form and transformed to a pale yellow dihydrochloride; yield 10.8 g.; M.P. 174–180° C. Recrystallization from a mixture of water and acetone gave 2 - (2 - morpholinoethyl) - 1,4,6 - trimethyl - N - phenyl-2-azabicyclo[3.2.2]non - 6 - ene - 8,9 - dicarboximide dihydrochloride in the form of white prisms; M.P. 185–186° C.

*Anaylsis.*—Calcd.—for $C_{25}H_{25}Cl_2N_3O_3$: C, 60.48; H, 7.11; N, 8.46. Found: C, 60.10; H, 7.35; N, 8.30.

I.R. (principal bands; mineral oil mull) 1775 and 1710 cm.$^{-1}$.

Use of one mole of hydrogen chloride per mole of dicarboximide rather than two or more moles of hydrogen chloride gives the monohydrochloride. Use of sulfuric acid, phosphoric acid, benzoic acid, and salicyclic acid in place of the hydrogen chloride gives the corresponding sulfuric, phosphoric, benzoic, and salicylic mono- and diacid addition salts.

EXAMPLE 28

*2-[2-(1-pyrrolidinyl)ethyl]-1,4,6-trimethyl-N-p-tolyl-2-azabicyclo[3.2.2]non-6-ene-8,9-dicarboximide*

Following the procedure of Example 27, the 1,3-dihydro - 1 - [2 - (1 - pyrrolidinyl)ethyl] - 3,5,7 - trimethyl-2H-azepine obtained in Example 17 was reacted with N-p-tolylmaleimide to give 2 - [2 - (1 - pyrrolidinyl) ethyl] - 1,4,6 - trimethyl - N - p - tolyl - 2 - azabicyclo [3.2.2]non-6-ene-8,9-dicarboximide and its dihydrochloride.

EXAMPLE 29

*2-[2-(2,2,4-trimethyl-1-pyrrolidinyl)ethyl]-1,4,6-trimethyl-N-butyl-2-azabicyclo[3.2.2]non-6-ene-8,9-dicarboximide*

Following the procedure of Example 27, the 1,3-dihydro - 1 - [2 - (2,2,4 - trimethyl - 1 - pyrrolidinyl) ethyl] - 3,5,7 - trimethyl - 2H - azepine obtained in Example 18 was reacted with N-butyl-maleimide to give 2 - [2 - (2,2,4 - trimethyl - 1 - pyrrolidinyl)ethyl] - 1,4,-6 - trimethyl - N - butyl - 2 - azabicyclo[3.2.2]non - 6-ene-8,9-dicarboximide and its dihydrochloride.

EXAMPLE 30

*2 - [2 - (1 - pyrrolidinyl)propyl] - 1,4,6 - trimethyl - N-p - ethylphenyl - 2 - azabicyclo[2.2.2]non - 6 - ene - 8,9-dicarboximide.*

Following the procedure of Example 27, the 1,3-dihydro-1-[2-(1-pyrrolidinyl)propyl] - 3,5,7 - trimethyl - 2H-azepine obtained in Example 19 was reacted with N-p-ethylphenylmaleimide to give 2 -[2 - (1 - pyrrolidinyl) propyl] - 1,4,6 - trimethyl - N - p - ethylphenyl - 2 - azabicyclo[3.2.2]non-6-ene-8,9-dicarboximide and its dihydrochloride.

EXAMPLE 31

*2-(3-piperidinopropyl)-1,4,6-trimethyl-N-hexyl-2-azabicyclo[3.2.2]non-6-ene-8,9-dicarboximide*

Following the procedure of Example 27, the 1,3-dihydro - 1 - (3 - piperidinopropyl) - 3,5,7 - trimethyl - 2H-azepine obtained in Example 20 was reacted with N-hexylmaleimide to give 2 - (3 - piperidinopropyl) - 1,4,6-trimethyl - N - hexyl - 2 - azabicyclo[3.2.2] - non - 6-ene-8,9-dicarboximide and its dihydrochloride.

EXAMPLE 32

*2 - [2 - (1 - hexahydroazepinyl)ethyl] - 1,4,6 - trimethyl-N - (2,4 - xylyl) - 2 - azabicyclo[3.2.2]non - 6 - ene-8,9-dicarboximide*

Following the procedure of Example 27, the 1,3-dihydro - 1 - [2 - (1 - hexahydroazepinyl)ethyl] - 3,5,7 - trimethyl - 2H - azepine obtained in Example 21 was reacted with N - (2,4 - xylyl)maleimide to give 2 - [2 - (1-hexahydroazepinyl)ethyl] - 1,4,6 - trimethyl - N - (2,4-xylyl) - 2 - azabicyclo[3.2.2]non - 6 - ene - 8,9 - dicarboximide and its dihydrochloride.

Following the procedure of Example 27, but substituting for the particular combination of the 1,3-dihydro-2H-azepine and the maleimide used therein, 1,3-dihydro-1-[2-(1-aziridinyl) - ethyl]-3,7-dimethyl-2H-azepine plus N-methylmaleimide; 1,2-dihydro-1-[3-(1 - azetidinyl)propyl]-3,7-diethyl-2H-azepine plus N-isohexylmaleimide; 1, 3 - dihydro - 1-[3-(2-methyl-5-ethylpiperidino)-propyl]-3, 5,7-triethyl-2H-azepine plus N-p-isopropylphenyl-maleimide; 1,3-dihydro-1-[2-(1-heptamethylenimino)ethyl]-3,7-dimethyl-5-ethyl-2H-azepine plus N-o-tolylmaleimide; 1,3-dihydro-1-[3-(1-octamethylenimino)propyl] - 5 - tert-butyl-3,7-dimethyl-2H-azepine plus N-(2,4-xylyl)maleimide; and 1,3-dihydro-1-(1-methyl-2-thiomorpholinoethyl) - 5-sec - butyl-3,7-dimethyl-2H-azepine plus N-(3,5-diethylphenyl)maleimide, there are obtained 2-[2-(1-aziridinyl) ethyl]-1,4 - dimethyl-N-methyl-2 - azabicyclo[3.2.2]non-6-ene-8,9-dicarboximide; 2-[3-(1-azetidinyl)propyl] - 1,4-diethyl - N-isohexyl-2-azabicyclo[3.2.2]-non-6-ene-8,9-dicarboximide; 2-[3-(2-methyl-5-ethylpiperidino)-propyl]-1,4,6-triethyl-N-p-isopropylphenyl - 2-azabicyclo[3.2.2]-non-6-ene-8,9-dicarboximide; 2-[2-(1 - heptamethylenimino)ethyl]-1,4-dimethyl-6-ethyl-N-o-tolyl - 2 - azabicyclo[3.2.2]non-6-ene-8,9-dicarboximide; 2-[3-(1-octamethylenimino)propyl] -6-tert-butyl-1,4-dimethyl-N-(2,4-xylyl)-2-azabicyclo[3.2.2]non-6-ene - 8,9-dicarboximide; and 2-(1-methyl-2-thiomorpholinoethyl) - 6 - sec-butyl-1,4-dimethyl-N-(3,5-diethylphenyl)-2-azabicyclo-[3.2.2]non-6-ene-8,9-dicarboximide, respectively, as well as the mono- and dihydrochlorides of each of these dicarboximides. Following the procedure of Example 27, the dicarboximides of Examples 28, 29, 30, 31 and 32 as well as each of the other dicarboximides mentioned above after Example 32 is transformed to the corresponding sulfuric, phosphoric, benzoic, and salicylic acid mono- and diacid addition salts.

EXAMPLE 33

*2-acetyl-1,4,6-trimethyl-N-phenyl-2-azabicyclo[3.2.2] non-6-ene-8,9-dicarboximide*

A mixture of 1,4,6-trimethyl-N-phenyl-2-azabicyclo[3.2.2]non-6-ene-8,9-dicarboximide (0.96 g.; 0.003 mole) and acetic anhydride (5.0 ml.; 4.6 g.; 0.045 mole) was protected from atmospheric moisture with a tube of calcium chloride and was heated at about 100 °C. for 2 hours. The resulting solution was allowed to stand at about 25° C. for about 17 hours. The crystals which separated were filtered, washed with hexane, and dried to give 1.0 g. of a solid; M.P. 226.5–228° C. Recrystallization from a mixture of water and acetic acid gave 2 - acetyl - 1,4,6 - trimethyl - N - phenyl - 2 - azabicyclo[3.2.2]non - 6 - ene - 8,9 - dicarboximide in the form of white prisms; M.P. 229–230.5° C.

*Analysis.*—Calcd. for $C_{21}H_{24}N_2O_3$: C, 71.57; H, 6.86; N, 7.95. Found: C, 71.91; H, 7.03; N, 7.79.

I.R. (principal bands; mineral oil mull) 1768, 1710, 1656, 1639 cm.$^{-1}$.

Following the procedure of Example 33 but using in place of acetic anhydride, propionic anhydride; butyric anhydride; isobutyric anhydride; valeric anhydride; and the mixed anhydride of formic and acetic acids, there are obtained 2-propionyl-1,4,6-trimethyl-N-phenyl-2-azabicyclo [3.2.2]non-6-ene-8,9-dicarboximide;

2-butyryl-1,4,6-trimethyl-N-phenyl-2-azabicyclo[3.2.2] non-6-ene-8,9-dicarboximide;

2-isobutyryl-1,4,6-trimethyl-N-phenyl-2-azabicyclo[3.2.2] non-6-ene-8,9-dicarboximide;

2-valeryl-1,4,6-trimethyl-N-phenyl-2-azabicyclo[3.2.2] non-6-ene-8,9-dicarboximide; and 2-formyl-1,4,6-trimethyl-N-phenyl-2-azabicyclo[3.2.2] non-6-ene-8,9-dicarboximide, respectively.

Following the procedure of Example 33 but using in place of the combination of 1,4,6-trimethyl-N-phenyl-2-azabicyclo[3.2.2]non-6-ene-8,9-dicarboximide and acetic anhydride, 1,4,6 - trimethyl-N-methyl-2-azabicyclo[3.2.2]non-6-ene-8,9-dicarboximide plus the mixed anhydride of formic and acetic acids; 1,4-dimethyl-N-ethyl-2-azabicyclo[3.2.2]non-6-ene-8,9-dicarboximide plus acetic anhydride; 1,4 - diethyl-N-hexyl-2-azabicyclo[3.2.2]non-6-ene-8,9-dicarboximide plus propionic anhydride; 6-tert-butyl-1,4-dimethyl-N-o-tolyl - 2 - azabicyclo[3.2.2]non-6-ene-8,9-dicarboximide plus butyric anhydride; and 1,4,6-triethyl-N-(2,4-xylyl)-2-azabicyclo[3.2.2]non-6-ene - 8,9-dicarboximide plus acetic anhydride, there are obtained 2-formyl-1,4,6-trimethyl-N-methyl-2-azabicyclo[3.2.2] non-6-ene-8,9-dicarboximide;

2-acetyl-1,4-dimethyl-N-ethyl-2-azabicyclo[3.2.2]non-6-ene-8,9-dicarboximide;

1,4-diethyl-N-hexyl-2-propionyl-2-azabicyclo[3.2.2]non-6-ene-8,9-dicarboximide;

6-tert-butyl-2-butyryl-1,4-dimethyl-N-o-tolyl-2-azabicyclo[3.2.2]non-6-ene-8,9-dicarboximide, and 2-acetyl-1,4,6-triethyl-N-(2,4-xylyl)-2-azabicyclo[3.2.2] non-6-ene-8,9-dicarboximide, respectively.

I claim:
1. A compound of the formula:

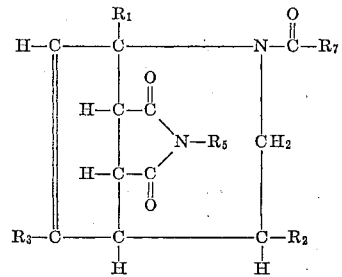

wherein $R_1$ and $R_2$ are alkyl of 1 to 4 carbon atoms, inclusive wherein $R_3$ and $R_7$ are selected from the group consisting of hydrogen and alkyl of 1 to 4 carbon atoms, inclusive, and wherein $R_5$ is selected from the group consisting of lower alkyl, phenyl, lower-alkylphenyl, and di-lower-alkylphenyl.

2. 2-acetyl-1,4,6-trimethyl-N-phenyl - 2 - azabicyclo [3.2.2]non-6-ene-8,9-dicarboximide.

No references cited.

ALEX MAZEL, *Primary Examiner.*

JOSE TOVAR, *Assistant Examiner.*